(12) United States Patent
Li et al.

(10) Patent No.: US 8,717,405 B2
(45) Date of Patent: May 6, 2014

(54) METHOD AND DEVICE FOR GENERATING 3D PANORAMIC VIDEO STREAMS, AND VIDEOCONFERENCE METHOD AND DEVICE

(75) Inventors: Kai Li, Shenzhen (CN); Yuan Liu, Shenzhen (CN); Jing Wang, Shenzhen (CN); Honghong Su, Shenzhen (CN); Song Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 336 days.

(21) Appl. No.: 13/172,193

(22) Filed: Jun. 29, 2011

(65) Prior Publication Data

US 2011/0316963 A1  Dec. 29, 2011

Related U.S. Application Data

(63) Continuation of application No. PCT/CN2009/075383, filed on Dec. 8, 2009.

(30) Foreign Application Priority Data

Dec. 30, 2008  (CN) .......................... 2008 1 0247531
Feb. 26, 2009  (CN) .......................... 2009 1 0118629

(51) Int. Cl.
  *H04N 7/14*  (2006.01)
(52) U.S. Cl.
  USPC ........................................ 348/14.08; 382/285
(58) Field of Classification Search
  USPC ............... 379/93.21, 158, 202.01; 348/14.01, 348/14.08, 14.12; 382/285, 294, 284
  See application file for complete search history.

(56) References Cited

U.S. PATENT DOCUMENTS

| 5,850,352 A | 12/1998 | Moezzi et al. |
| 5,986,668 A | 11/1999 | Szeliski et al. |
| 5,999,662 A | 12/1999 | Burt et al. |
| 6,208,373 B1 * | 3/2001 | Fong et al. ................. 348/14.16 |
| 7,277,118 B2 | 10/2007 | Foote |
| 8,467,510 B2 * | 6/2013 | Hillis et al. ................ 379/93.21 |
| 2002/0172859 A1 | 11/2002 | Roh et al. |

(Continued)

FOREIGN PATENT DOCUMENTS

| CN | 1715987 A | 1/2006 |
| CN | 1922544   | 2/2007 |

(Continued)

OTHER PUBLICATIONS

Chinese Office Action mailed Jun. 9, 2011 in correspondence with Chinese Application No. 200810247531.5.

(Continued)

*Primary Examiner* — Olisa Anwah
(74) *Attorney, Agent, or Firm* — Staas & Halsey LLP

(57) ABSTRACT

A method and a device for generating 3-dimensional (3D) panoramic video streams, a videoconference method, and a videoconference device are disclosed. The method includes: obtaining depth information of at least two video images; obtaining image data in multiple depth positions from a corresponding video image according to the depth information of each video image; stitching data of the video images according to the obtained image data in multiple depth positions, and generating 3D panoramic video streams. The technical solution of the present invention provides users with high-resolution 3D panoramic seamless telepresence conference video images based on different display modes of different display devices.

42 Claims, 24 Drawing Sheets

(56) References Cited

U.S. PATENT DOCUMENTS

| | | | |
|---|---|---|---|
| 2002/0191846 A1 | 12/2002 | Crinon et al. | |
| 2003/0122925 A1* | 7/2003 | Yoon | 348/51 |
| 2004/0100565 A1 | 5/2004 | Chen et al. | |
| 2004/0228544 A1 | 11/2004 | Endo et al. | |
| 2004/0263611 A1* | 12/2004 | Cutler | 348/36 |
| 2005/0185047 A1 | 8/2005 | Hii | |
| 2006/0072852 A1* | 4/2006 | Kang et al. | 382/294 |
| 2007/0159527 A1 | 7/2007 | Kim et al. | |
| 2007/0291110 A1* | 12/2007 | Era | 348/42 |
| 2013/0162768 A1* | 6/2013 | Lie et al. | 348/43 |

FOREIGN PATENT DOCUMENTS

| | | |
|---|---|---|
| CN | 101015220 A | 8/2007 |
| CN | 101051386 A | 10/2007 |
| CN | 101277454 A | 10/2008 |
| CN | 101577795 A | 11/2009 |
| CN | 101771830 | 9/2012 |
| EP | 0905988 | 3/1999 |
| WO | 2008/111080 | 9/2008 |

OTHER PUBLICATIONS

Written Opinion of the International Searching Authority mailed Mar. 18, 2010 in correspondence with PCT/CN2009/075383.

Matthew Uyttendaele et al. "Image-Based Interactive Exploration of Real-World Environments," IEEE Computer Graphics and Applications, May/Jun. 2004, pp. 52-63.

Matthew Uyttendaele et al. "Eliminating Ghosting and Exposure Artifacts in Image Mosaics," pp. 1-8.

Yoshikuni Nomura et al. "Scene Collages and Flexible Camera Arrays," Eurographics Symposium on Rendering (2007).

Jason Meltzer et al. "Multiple View Feature Descriptors from Image Sequences via Kernel Principal Component Analysis," pp. 1-12.

Vivek Kwatra et al. "Graphcut Textures: Images and Video Synthesis Using Graph Cuts," GVU Center/College of Computing Georgia Institute of Technology <http://www.cc.gatech.edu/cpl/projects/graphcuttextures>.

Sing Bing Kang et al. "Seamless Stitching using Multi-Perspective Plane Sweep," Technical Report MSR-TR-2004-48, Microsoft Research, Microsoft Corporation, Jun. 2004.

Hailin Jin "A Three-Point Minimal Solution for Panoramic Stitching with Lens Distortion," Advanced Technology Labs, Adobe Systems Incorporated.

J.J. Guerrero et al. "From Lines to Homographies between Uncalibrated Images," IX Spanish Symposium on Pattern Recognition and Image Analysis (2001) pp. 233-240.

Michael Goesele et al. "Multi-View Stereo for Community Photo Collections".

Henry Fuchs et al. "Optimizing a Head-Tracked Stereo Display System to Guide Hepatic Tumor Ablation".

M. Brown et al. "Recognising Panoramas," Department of Computer Science, University of British Columbia.

Peter J. Burt et al. "A Multiresolution Spline With Application to Image Mosaics," ACM Transactions on Graphics, vol. 2 No. 4, Oct. 1983, pp. 217-236.

Matthew Brown et al. "Multi-Image Matching using Multi-Scale Oriented Patches".

P.H.S. Torr et al. "MLESAC: A new robust estimator with application to estimating image geometry," MSR-TR-99-60, Oct. 18, 1999.

Richard Szeliski "Image Alignment and Stitching: A Tutorial," Technical Report MSR-TR-2004-92, Microsoft Research, Microsoft Corporation, Last updated Dec. 10, 2006.

Pollefyes, M. et al., *Detailed Real-Time Urban 3D Reconstruction from Video*, Int. J. Comput. Vis., vol. 78, 2008, pp. 143.167.

Zhi, Q. et al., *Depth-based Image Mosaicing for Both Static and Dynamic Scenes*, IEEE, 2008 (4 pages).

Written Opinion of the International Searching Authority, mailed Mar. 18, 2010, in corresponding International Application No. PCT/CN2009/075383 (5 pages).

Extended European Search Report, mailed Nov. 17, 2011, in corresponding European Application No. 09836013.4 (8 pages).

\* cited by examiner

CONT. FROM FIG. 4A

Select matched feature points of every two adjacent video images to be rectified from the overlap region — S404

Generate a color rectification matrix of every two adjacent video images to be rectified according to the matched feature points — S405

Use the color rectification matrix to rectify the video images to be stitched — S406

Stitch the rectified but unstitched video images according to the obtained image data in multiple depth positions, and generate 3D panoramic video streams — S407

FIG. 4B

METHOD AND DEVICE FOR GENERATING 3D PANORAMIC VIDEO STREAMS, AND VIDEOCONFERENCE METHOD AND DEVICE

CROSS-REFERENCE TO RELATED APPLICATIONS

This application is a continuation of International Application No. PCT/CN2009/075383, filed on Dec. 8, 2009, which claims priority to Chinese Patent Application No. 200810247531.5, filed on Dec. 30, 2008 and Chinese Patent Application No. 200910118629.5, filed on Feb. 26, 2009, all of which are hereby incorporated by reference in their entireties.

FIELD OF THE INVENTION

The present invention relates to a video stitching technology, and in particular, to a video stitching technology in a telepresence conference system, and more specifically, to a method and a device for generating a three-dimensional (3D) panoramic video streams, a videoconference method, and a videoconference device.

BACKGROUND OF THE INVENTION

The telepresence technology in the prior art is a technology of combining high-quality audio, high-definition video pictures, and interactive components, and enables users to hold a meeting through a network as if they are physically on the spot. For example, the telepresence conference system provides real-time face-to-face interaction experience for users through advanced video, audio and coordination technologies. The telepresence conference system can even provide pictures of an apartment, and create face-to-face conference experience around a virtual conference table through images of a physical size, high-definition resolution, and stereoscopic and multi-channel audio. Although the existing telepresence brings apartment conference experience which is better and more authentic than a traditional conference system, the existing telepresence is different from the real-life face-to-face communication because it provides no authentic 3D experience. The video information to a participant is only 2-dimensional planar information rather than communication information characterized by depth and hierarchy.

The existing 3D video technology provides pictures that comply with 3D visual principles and offer depth information, demonstrates the views in the real life onto the screen, and renders the scenes in depth, hierarchically, and authentically. It is a megatrend of video technologies. However, the 3D video technology has not been applied widely for lack of mature technologies, cost-efficient display devices, and standards.

The existing image stitching technology can break through the physical restriction of the imaging device and generate digital panoramic images of a wide field of view. However, the following problems exist in the image stitching: (1) It is hard to reconstruct occlusion and cavities of virtual viewpoints; (2) the original viewpoints differ sharply, the parallax is great, many more intermediate virtual viewpoint images of continuous viewpoints need to be generated, and the amount of calculation increases sharply; and (3) the parallax calculation problem is still not well solved.

Therefore, the telepresence conference system in the prior art is incapable of providing high-resolution panoramic seamless 3D conference experience.

SUMMARY OF THE INVENTION

The embodiments of the present invention provide a method and a device for generating 3D panoramic video streams, a videoconference method, and a videoconference device, so as to offer high-resolution panoramic seamless 3D telepresence conference video images by using different display modes of different display devices.

One objective of the present invention provides a method for generating 3D panoramic video streams. The method includes: obtaining depth information of at least two video images to be stitched; obtaining image data in multiple depth positions from a corresponding video image to be stitched according to the depth information of each video image to be stitched; and stitching data of the video images according to the obtained image data in multiple depth positions, and generating 3D panoramic video streams.

Another objective of the present invention is to provide a 3D panoramic videoconference method. The method includes: obtaining video streams of the same site synchronously from at least two viewpoints; obtaining image data in multiple depth positions from a corresponding video stream according to depth information of each video stream; stitching the video streams obtained from different viewpoints according to the depth information, and generating 3D panoramic video streams; and displaying video images of the 3D panoramic video streams on a terminal display according to a type of the terminal display.

Another objective of the present invention is to provide a device for generating 3D panoramic video streams. The device includes: a depth information obtaining apparatus, configured to obtain depth information of at least two video images to be stitched; a hierarchical image obtaining apparatus, configured to obtain image data in multiple depth positions from a corresponding video image to be stitched according to the depth information of each video image to be stitched; and a 3D panoramic video stream generating apparatus, configured to stitch data of the video images according to the obtained image data in multiple depth positions, and generate 3D panoramic video streams.

Another objective of the present invention is to provide a 3D panoramic videoconference device. The device includes: a depth information obtaining apparatus, configured to obtain video streams of the same site synchronously from at least two viewpoints; a hierarchical image obtaining apparatus, configured to obtain image data in multiple depth positions from a corresponding video stream according to depth information of each video stream; a 3D panoramic video stream generating apparatus, configured to stitch the video streams obtained from different viewpoints based on the depth information, and generate 3D panoramic video streams; and a video image display apparatus, configured to display video images of the 3D panoramic video streams on a terminal display according to a type of the terminal display.

The embodiments of the present invention bring at least the following benefits: The technical solution of the present invention implements fast and real-time stitching of video images, simplifies the stitching of video images, improves efficiency of stitching video images, provides users with 3D panoramic seamless conferences of better luminance and hue effects, and enables the users to enjoy more advanced and authentic experience than the traditional telepresence.

BRIEF DESCRIPTION OF THE DRAWINGS

To make the technical solution of the present invention clearer, the accompanying drawings for illustrating the embodiments of the present invention are described briefly below. Evidently, the accompanying drawings are for the exemplary purpose only, and those skilled in the art can derive other drawings from such accompanying drawings without any creative effort.

FIGS. 4A and 4B are a flow chart of a method for generating 3D panoramic video streams according to Embodiment 2 of the present invention;

DETAILED DESCRIPTION OF THE EMBODIMENTS

The following detailed description is given with reference to the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the scope of the present invention.

Figure 1:
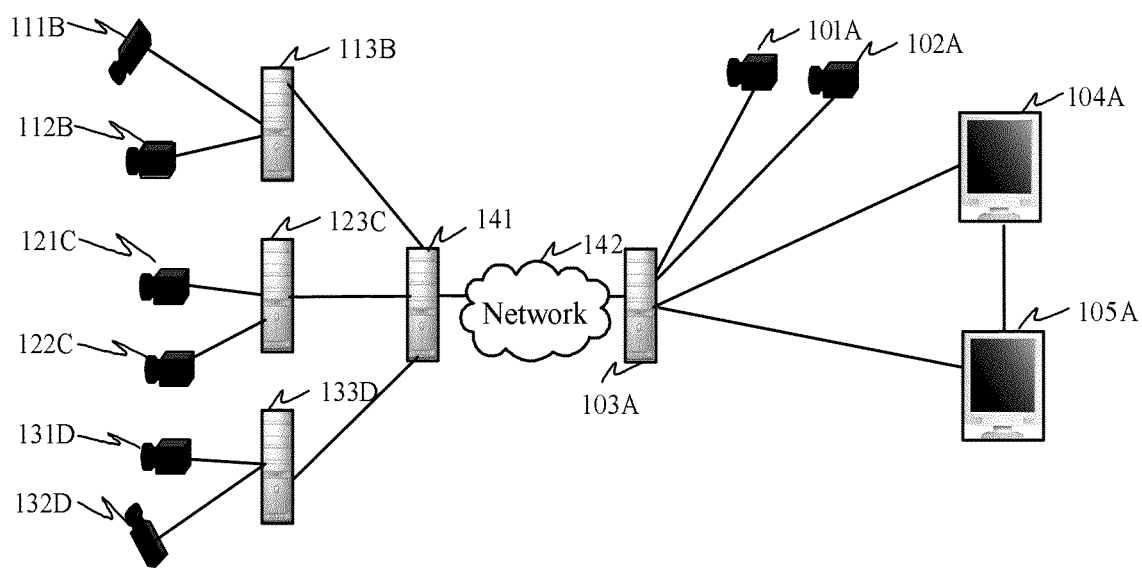
FIG. 1 shows a multi-viewpoint videoconference system based on depth cameras according to an embodiment of the present invention.

As shown in FIG. 1, the embodiments of the present invention put forward a multi-site, 2D/3D/multi-layer, and multi-viewpoint videoconference system based on depth cameras.

A site A includes: depth cameras (101A, 102A), a videoconference server 103A, and terminal display devices (104A, 105A). The depth cameras (101A, 102A) are connected to the terminal display devices (104A, 105A) through the videoconference server 103A, and the terminal display devices (104A, 105A) may be 2D displays, 3D displays, or multi-layer displays.

A site B includes: depth cameras (111B, 112B), and a server 113B which is connected to the depth cameras (111B, 112B).

A site C includes: depth cameras (121C, 122C), and a server 123C which is connected to the depth cameras (121C, 122C).

A site D includes: depth cameras (131D, 132D), and a server 133D which is connected to the depth cameras (131D, 132D).

The server 103A is connected to the servers (113B, 123C, 133D) through a network 142 and a transmission device 141. The network 142 may be a cabled network, Internet, or satellite network.

Embodiment 1

Figure 2:
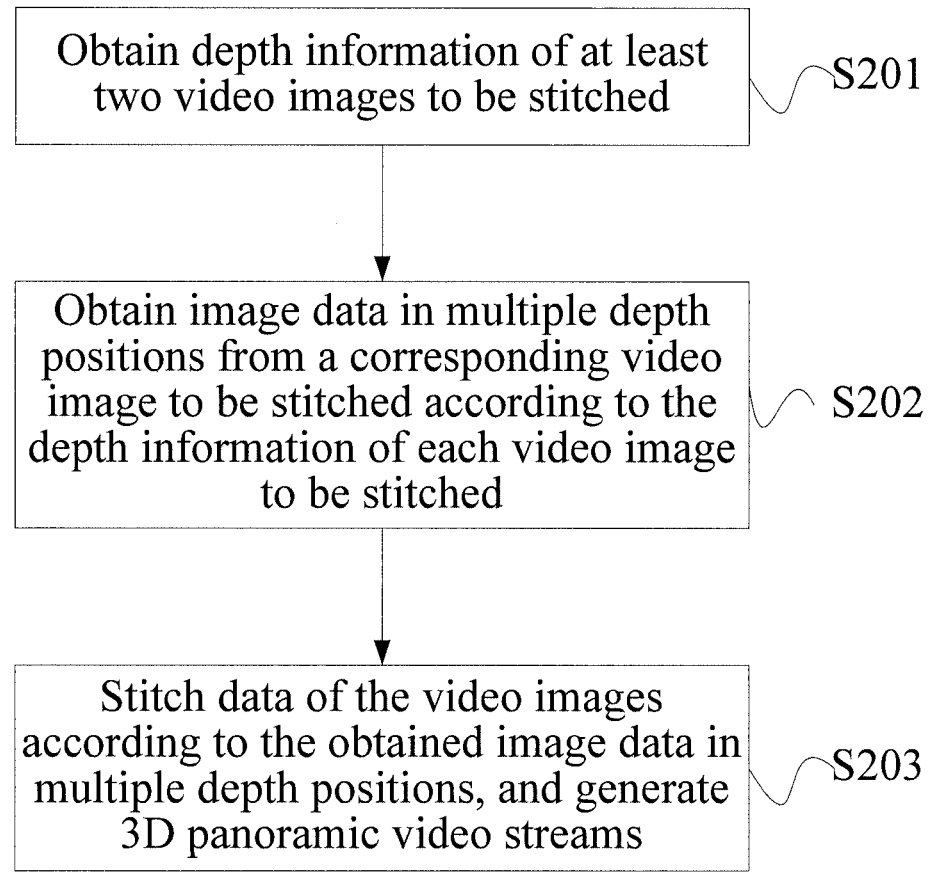
FIG. 2 is a flow chart of generating 3D panoramic video streams according to Embodiment 1 of the present invention.

As shown in FIG. 2, the method for generating 3D panoramic video streams according to this embodiment includes the following steps:

S201. Obtain depth information of at least two video images to be stitched.

S202. Obtain image data in multiple depth positions from a corresponding video image to be stitched according to the depth information of each video image to be stitched.

S203. Stitch data of the video images according to the obtained image data in multiple depth positions, and generate 3D panoramic video streams.

As shown in FIG. 1, the depth cameras (111B, 112B) obtain video streams of the site B and depth information of each image from two viewpoints synchronously, and obtain depth images in different depth positions according to the depth information of the images. For areas with a little change of depth, the image stitching is performed only once; for persons and objects that are moving, it is necessary to stitch each frame in real time.

The areas with a little change of depth refer to: fixed furniture in a conference scene, videoconference devices which are in a fixed position (for example, cameras, wide-screen display devices, and printers). Such areas remain unchanged basically, and the depth position seldom or never changes. In this way, the areas with a little change of depth are retrieved beforehand by means of depth cameras, and two camera videos are stitched seamlessly.

The areas with sharp change of depth generally refer to moving persons or objects (such as chairs). Participants generally have movements, and the chairs move along with the movements. If a person (without stretching arms) moves sharply relative to the camera, the depth position of the person reflected in the time axis changes sharply. However, in the images taken by different cameras at the same time, the person is in the same depth. Therefore, it is easy to stitch images seamlessly through a traditional image stitching technology. If a person (stretching arms) moves sharply relative to the camera, the person is not in the same depth position in the images taken by different cameras at the same time, which leads to different depth positions/parallax. In this case, in the process of image stitching, it is necessary to obtain person image data and non-person image data from a corresponding video image according to depth information of each video image. The non-person image data is stitched to generate stitched non-person image data; the person image data is stitched to generate stitched person image data; and the stitched person image data is bonded to the stitched non-person image data to generate 3D panoramic video streams. At the time of stitching the person image data, an image change region of data of each person image in a current frame compared with data of a corresponding person image in a previous frame of each video stream may be detected. If the image change region is greater than a set threshold, only the person image data in the change region needs to be stitched.

Alternatively, background video image data and foreground image data are obtained from the corresponding video image according to the depth information of each video image. The obtained background image data is stitched to generate background panoramic image data; the obtained foreground image data is stitched to generate stitched foreground image data; and the stitched foreground image data is bonded to the background panoramic image data to generate 3D panoramic video streams. At the time of stitching the foreground video image data, the video image change region of foreground image data in the current frame compared with foreground image data in the previous frame of each video stream may be detected. If the video image change region is greater than a set threshold, only the foreground image data in the change region needs to be stitched.

Figure 3:
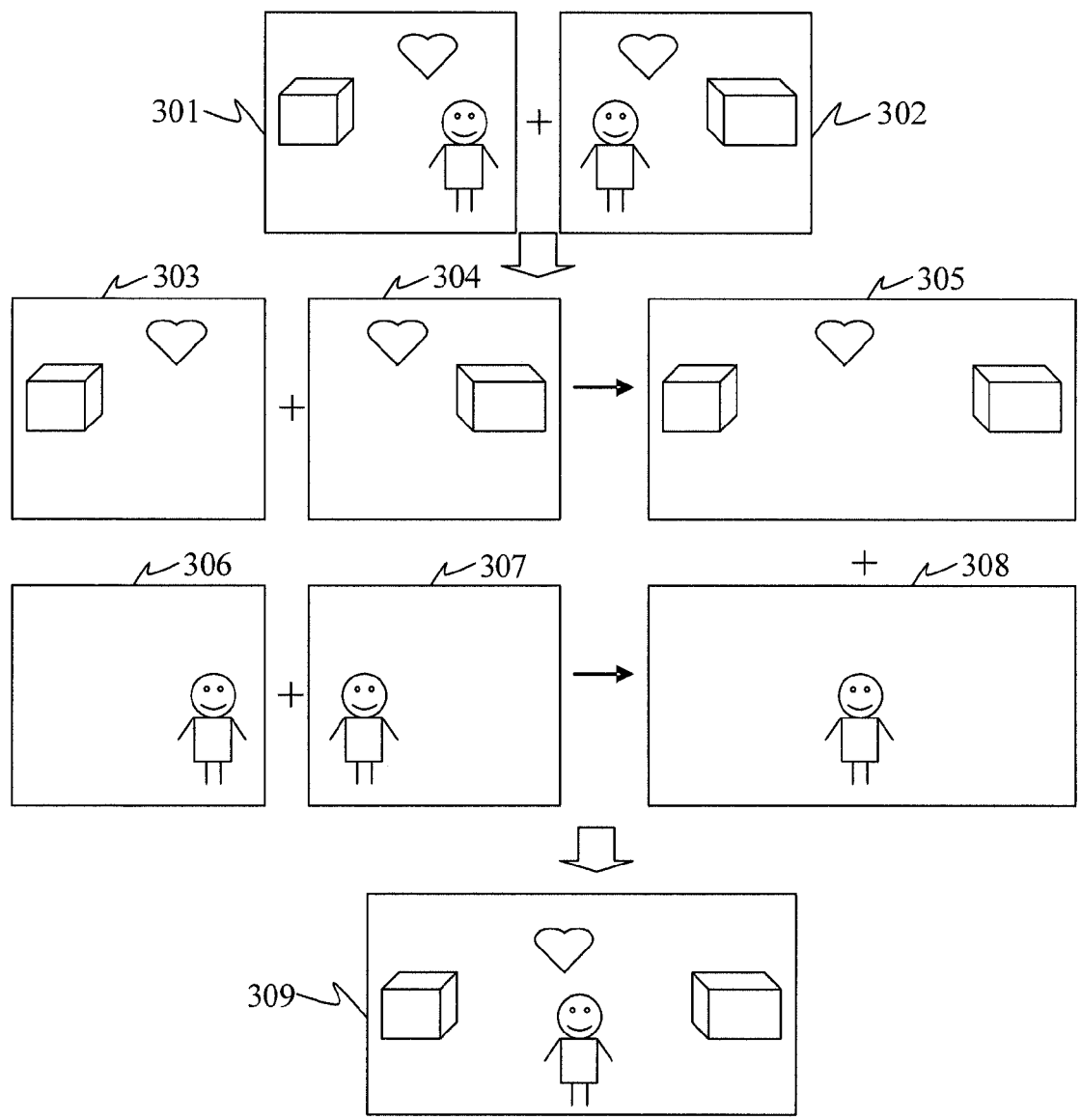
FIG. 3 is schematic diagram of video stitching based on a person layer and a non-person layer according to Embodiment 1 of the present invention.

As shown in FIG. 3, the person image data (306, 307) and the non-person image data (303, 304) are obtained from the video images (301, 302) according to the depth information of the images; the non-person image data (303, 304) is stitched to generate stitched non-person image data (305); the person image data (306, 307) is stitched to generate stitched person image data (308); and the stitched person image data (308) is bonded to the stitched non-person image data (305) to generate a synthesized video image (309), which is then coded and output.

The technical solution provided in this embodiment of the present invention implements fast and real-time stitching of video images, simplifies the stitching of video images, improves efficiency of stitching video images, provides users with 3D panoramic seamless high-resolution conferences, enables the users to enjoy more advanced and authentic experience than the traditional telepresence, and overcomes ghosts caused by parallax in multi-viewpoint video stitching, especially when the close-shot parallax is noticeable.

Embodiment 2

Figure 4A:
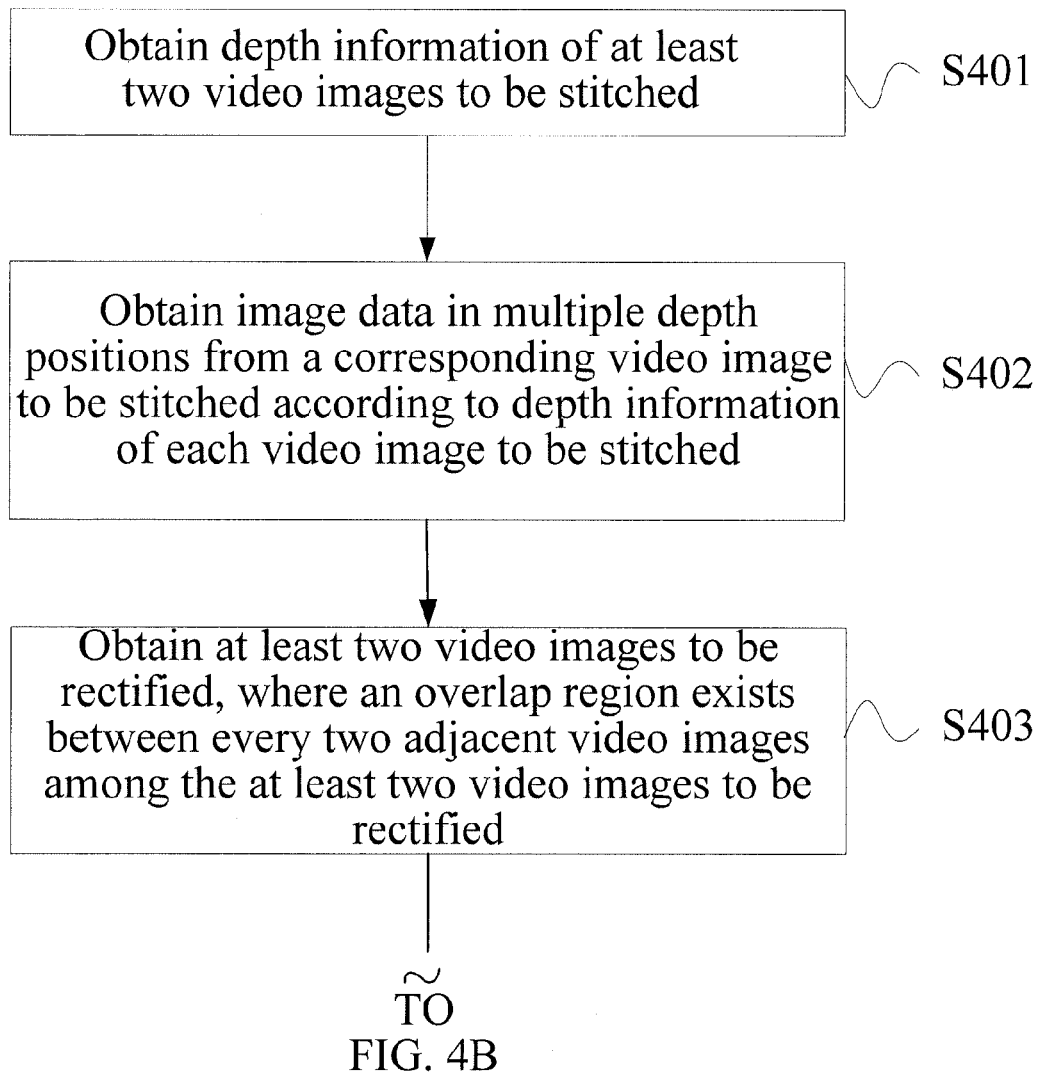

FIGS. 4A and 4B are a flow chart of a method for generating 3D panoramic video streams according to Embodiment 2 of the present invention. The method includes the following steps:

S401. Obtain depth information of at least two video images to be stitched.

S402. Obtain image data in multiple depth positions from a corresponding video image to be stitched according the depth information of each video image to be stitched.

Step S401 and step S402 in this embodiment are similar to step S201 and step S202 in Embodiment 1.

S403. Obtain at least two video images to be rectified, where an overlap region exists between every two adjacent video images among the at least two video images to be rectified.

S404. Select matched feature points of every two adjacent video images to be rectified from the overlap region.

In the process of implementing step S404, the matched feature points of every two adjacent video images may be obtained in different methods such as Harris feature point detection method, Smallest Univalue Segment Assimilating Nucleus (SUSAN) feature point detection method, wavelet-based feature point detection method, and Scale-Invariant Feature Transformation (SIFT) feature point detection method. The obtaining method is not limited herein.

S405. Generate a color rectification matrix of every two adjacent video images to be rectified according to the matched feature points.

S406. Use the color rectification matrix to rectify the video images to be stitched.

It should be noted that the color rectification matrix needs to be generated only once. If color rectification needs to be performed for different video images to be stitched later, it is necessary only to perform step S406 directly without repeating steps S403 to S405.

Therefore, in an embodiment of the present invention, steps S403 to S405 may occur before step S401 to obtain the color rectification matrix.

S407. Stitch the rectified video images to be stitched according to the obtained image data in multiple depth positions, and generate 3D panoramic video streams.

This embodiment can provide users with high-definition 3D panoramic seamless conferences, and can provide panoramic video streams of good luminance and hue by rectifying the color of the video images.

Although the histogram rectification in the prior art can rectify the deviation of luminance and hue, the prerequisite of rectifying the luminance and hue of the video images through a histogram is that the video images are very similar to each other. Therefore, in a scene of taking images from multiple viewpoints, when video images overlap each other to a small extent or do not overlap at all, the rectification deteriorates or fails due to sharp difference between the video images. Moreover, the rectification using a histogram takes a long time because real-time statistics and rectification needs to be performed on each image.

In this embodiment of the present invention, an overlap region between two adjacent images is required only at the time of calculating the color rectification matrix. In the rectification process, color rectification can be performed through the color rectification matrix no matter whether any overlap region exists between the video images. Moreover, the color rectification matrix needs to be generated only once, which saves time of rectifying the color of video images.

Embodiment 3

This is another embodiment of color rectification in the process of generating panoramic video streams. This embodiment shows a process of rectifying video images taken by two cameras. In the initial process of calculating the color rectification matrix, an overlap region needs to exist between two video images taken by the two cameras. In the subsequent rectification for two non-adjacent video images through the color rectification matrix, no overlap region is required between the two non-adjacent video images taken by the two cameras, but an overlap region needs to exist between two adjacent video images.

Figure 5A:
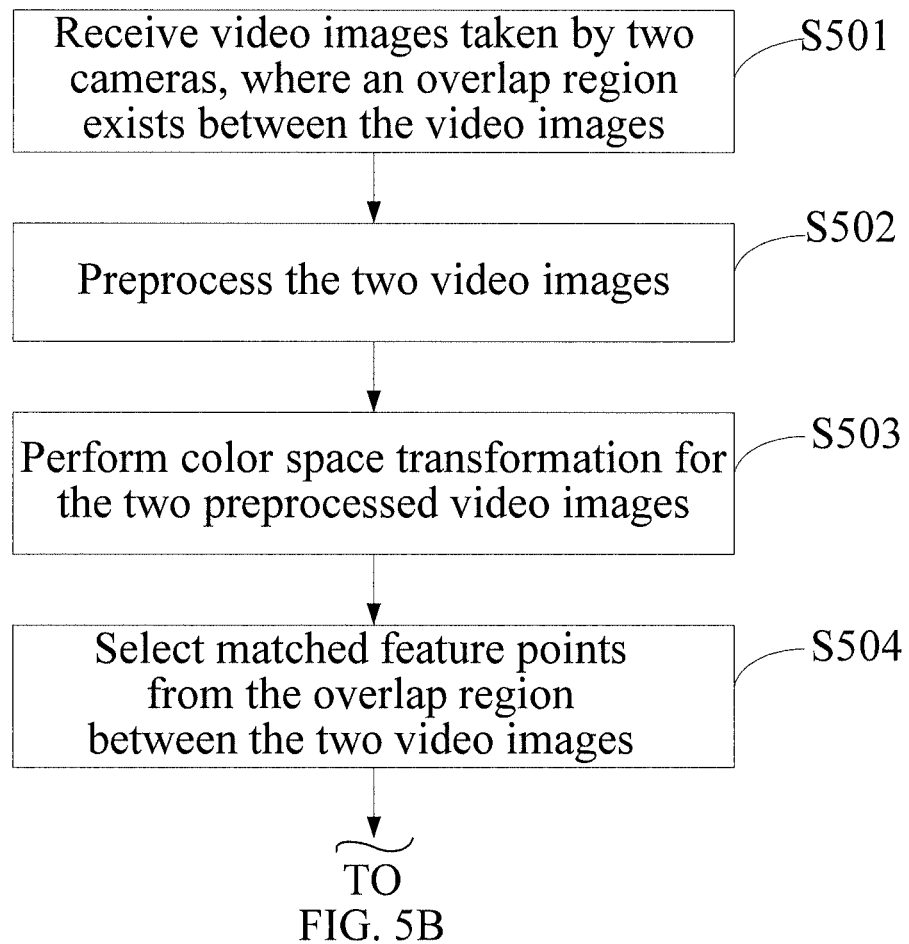
FIGS. 5A and 5B are a flow chart of a color rectification method according to Embodiment 3 of the present invention.
Figure 5B:
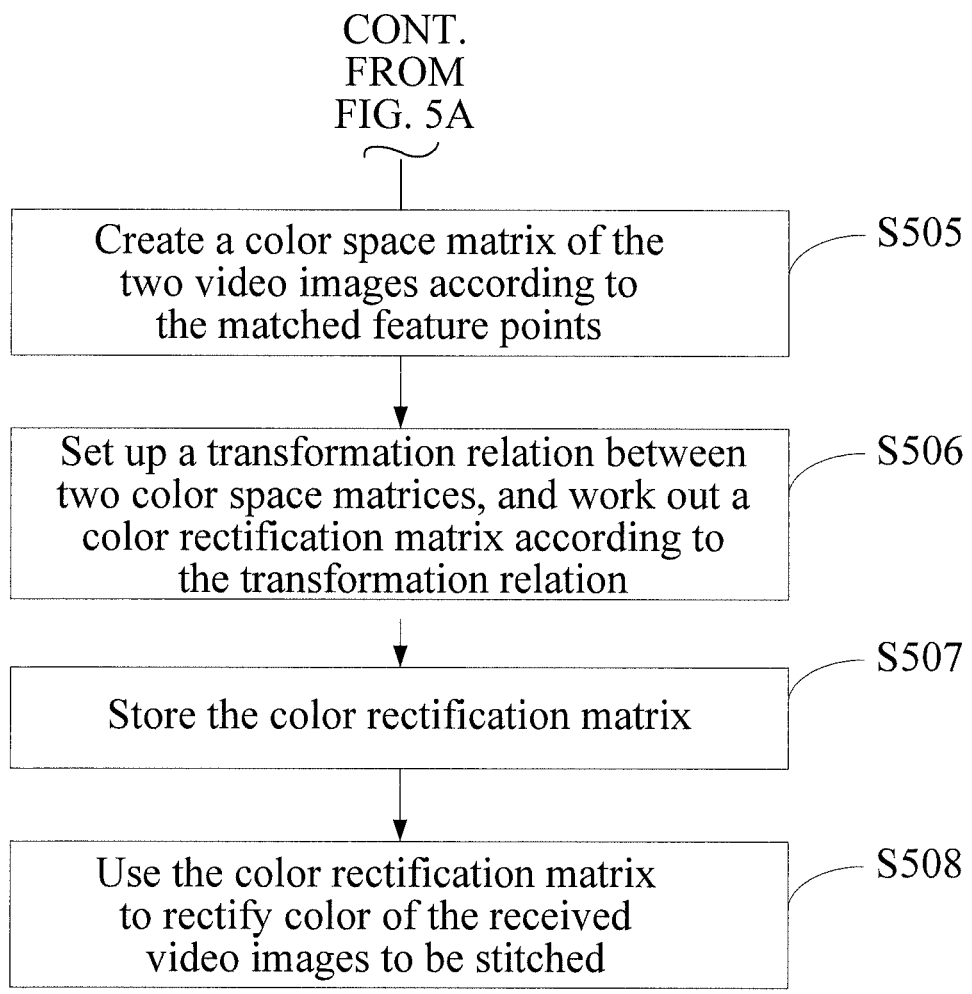

FIGS. 5A and 5B are a flow chart of a color rectification method according to Embodiment 3 of the present invention. The method includes the following steps:

S501. Receive video images taken by two cameras, where an overlap region exists between the video images.

Assuming that the two cameras are a source camera and a destination camera respectively, where the source camera takes a source video image, and the destination camera takes a destination video image, and the color of the source video image needs to be rectified as consistent with the color of the destination image.

Initially, positions of the two cameras may be adjusted to generate the overlap region between the source video image and the destination video image regardless of the size of the overlap region. Compared with the rectification based on a histogram in the prior art which requires a large area of overlap, this embodiment does not limit the size of the overlap region.

S502. Preprocess the two video images.

The preprocessing of the video images includes generally applied smooth denoising and distortion rectification. This step is optional.

S503. Perform color space transformation for the two preprocessed video images.

Color space transformation may be performed for the video images taken by the cameras. The video images before and after the transformation may be in one of the following formats: Red Green Blue (RGB), HSV, YUV, HSL, CIE-Lab, CIE-Luv, CMY, CMYK, and XYZ.

S504. Select matched feature points from the overlap region between the two video images.

It is understandable to those skilled in the art that the feature points may be obtained from the two video images in different methods such as Harris feature point detection method, SUSAN feature point detection method, wavelet-based feature point detection method, and SIFT feature point detection method. To achieve better effects, a SIFT algorithm is applied in this embodiment, which is characterized by being invariant in the case of spin, zoom and luminance change, and being stable to some extent in the case of viewpoint change, affine transformation, and noise. Apparently, the matched feature points in the overlap region of the two video images may be obtained through other algorithms, and the obtaining method is not limited herein.

The matched feature points in the overlap region may be selected in one of the following four modes:

Mode 1: Detect SIFT feature points in the overlap region, and match the detected feature points to obtain multiple pairs of matched feature points of two adjacent video images.

The SIFT feature point detection is the most commonly used mode of image processing in the prior art. Affine projection, luminance and hue keep unchanged by means of the SIFT feature point detection. It should be noted that other feature point detection modes in the prior art such as Harris detection, SUSAN detection, and improvements of them are also applicable so long as they can detect the feature points from the overlap region.

Among the detected feature points, unmatched feature points may be eliminated through a RANdom SAmple Consensus (RANSAC) method, and the remaining feature points are stable and reliable. The method of eliminating the unmatched feature points is covered in the prior art (such as a method based on probability statistics), and is not limited herein.

Mode 2: Detect SIFT feature points in the overlap region, and match the detected feature points to obtain multiple pairs of matched feature points of two adjacent video images. Find regions of the same area by pivoting on the matched feature points, and assign the mean value of the color features of the found regions to the matched feature points.

The method of detecting the feature points and the method of eliminating the unmatched feature points are the same as those described in mode 1 above.

For each pair of matched feature points, it is appropriate to find regions of the same area by pivoting on each of the pair of feature points, and use the regions as matched regions of the two video images. The mean value of color paths of the matched regions is used as a color value of the feature points. For example, for video images in an HSL format (H represents hue, S represents saturation, and L represents lightness), each matched point has corresponding H value, S value, and L value. A matched region is made up of points. The mean value of H values of all points in the region is H', the mean value of S values of all points in the region is S', and the mean value of L values of all points in the region is L'. Values H', S', and L' are assigned to the matched feature points.

Mode 3: Split the overlap region of the two video images, use the corresponding regions in the split overlap region of the two video images as matched feature points, and assign the mean value of color features of the corresponding regions to the matched feature points.

After the overlap region is split, several pairs of matched regions with different areas exist in the split overlap region of the two video images, and each region includes several feature points. The mean value of color paths of each region is assigned to the feature points. The process of averaging the color paths of each region is similar to that described in mode 2 above. After the mean value of color paths is calculated for the matched regions, several matched feature points are obtained.

Mode 4: Receive region blocks which are manually selected from the overlap region, use the corresponding selected region blocks of the two video images as matched feature points, and assign the mean value of color features of the corresponding region blocks to the matched feature points.

Mode 4 differs from mode 3 in that: In mode 3, an image rectifying apparatus may split the overlap region automatically in a preset mode; in mode 4, several matched regions are selected manually from the overlap region, and then the selected results are input into the image rectifying apparatus for subsequent processing.

S505. Create a color space matrix of the two video images according to the matched feature points.

It is assumed that the format of the video images is HSL after the color space of the two video images is transformed, and m (m is a natural number greater than 1) matched points are selected. The color space matrices of the source video image and the destination video image corresponding to the m matched points are:

$$\text{Mat\_dst} = \begin{pmatrix} h_{11} & s_{12} & l_{13} \\ \ldots & \ldots & \ldots \\ h_{m1} & s_{m2} & l_{m3} \end{pmatrix}_{dst}, \text{Mat\_src} = \begin{pmatrix} h_{11} & s_{12} & l_{13} \\ \ldots & \ldots & \ldots \\ h_{m1} & s_{m2} & l_{m3} \end{pmatrix}_{src}$$

In the formulae above, "Mat_dst" is the color space matrix of the destination video image, and "Mat_src" is the color space matrix of the source video image. For example, the first row of "Mat_dst" represents the first point among m points, "h11" is the hue value of the first point, "s12" is the saturation value of the first point, and "l13" is the luminance value of the first point. Therefore, "Mat_dst" is a matrix of H, S and L values of m destination pixel points of a destination video image in m matched points.

S506. Set up a transformation relation between two color space matrices, and work out a color rectification matrix according to the transformation relation.

Assuming that the color rectification matrix to be worked out is Mat_ColorRectify, the transformation relation is:

Mat_dst=Mat_ColorRectify*Mat_src+error

In the formula above, "error" represents error between color space matrices. Based on the foregoing transformation relation, the error is calculated as follows:

$$\sum_{i=1}^{m} (\text{Mat\_dst} - \text{Mat\_ColorRectify} * \text{Mat\_src})^2$$

When the error value in the foregoing formula is a minimum value, the Mat_ColorRectify is the calculated color rectification matrix.

S507. Store the color rectification matrix.

S508. Use the color rectification matrix to rectify the color of received video images to be stitched.

Subsequently, the calculated color rectification matrix can be applied to rectify color no matter how the source camera and the destination camera change their positions, and whether the taken video images are intersected. The color rectification process is as follows:

After the source camera inputs a video image to be rectified, a color space matrix of the video image to be rectified is generated. It is assumed that the video image to be rectified changes to the HSL format after the color space transformation, and this video image is made up of Y pixel points. Therefore, the color space matrix is a (Y*3) matrix, and each row of the matrix represents the H value, S value, and L value of a pixel point.

The Mat_ColorRectify is multiplied by the color space matrix of the video image to be rectified, a multiplication result is used as a color space matrix of the rectified video image, and the rectified video image is generated according to the color space matrix of the rectified video image.

In this embodiment of the present invention, color rectification is performed for video images. The overlap region between two adjacent images is required only at the time of calculating the color rectification matrix. In the rectification process, color rectification can be performed through the color rectification matrix no matter whether any overlap region exists between the video images. Moreover, the color rectification matrix needs to be generated only once, which saves time of rectifying color of the video images.

Embodiment 4

This is another embodiment of color rectification in the process of generating panoramic video streams. This embodiment shows a process of rectifying video images taken by N cameras. In the initial process of calculating a color rectification matrix, an overlap region needs to exist between video images taken by every two adjacent cameras. All N−1 pairs of video images are input, where images in each pair are adjacent to each other; and N−1 color rectification matrices are generated. At the time of rectifying the video images through the N−1 color rectification matrices, no overlap region is required between the images taken by the N cameras.

Figure 6A:
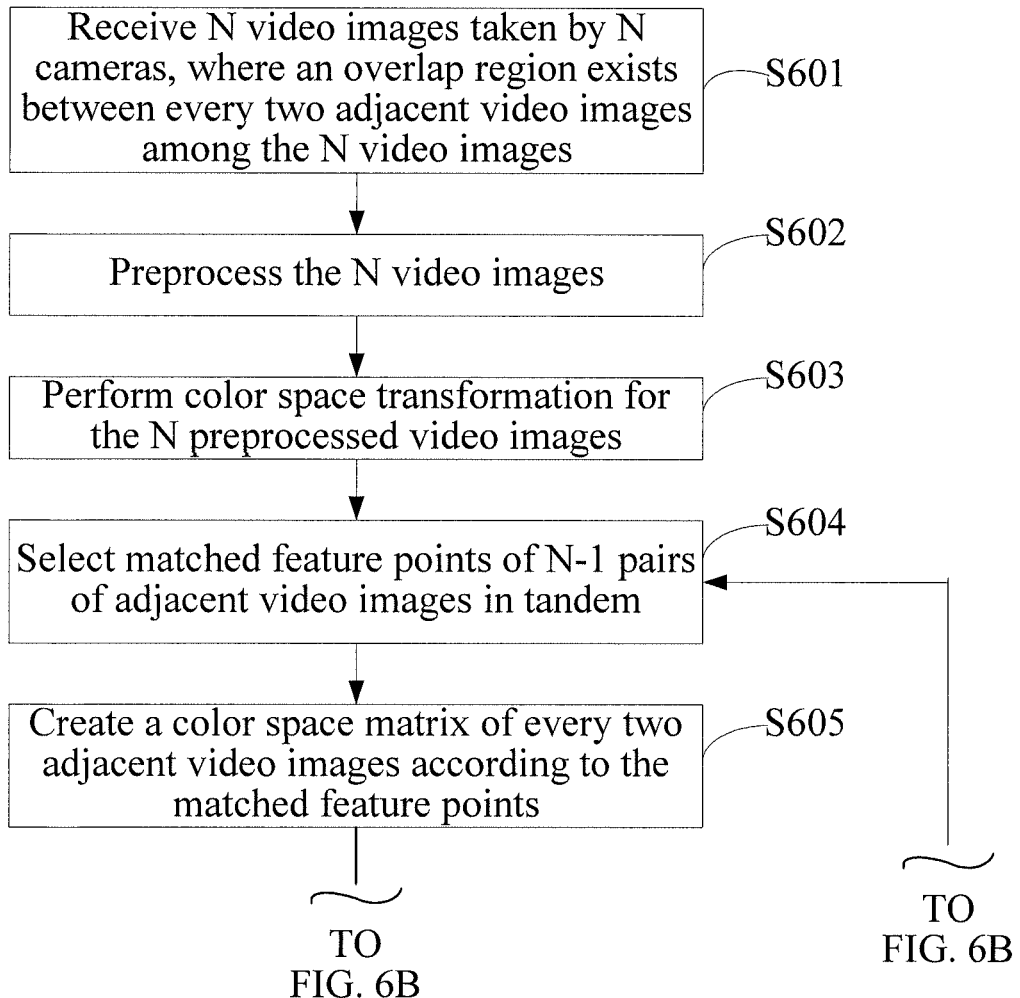
FIGS. 6A and 6B are a flow chart of a color rectification method according to Embodiment 4 of the present invention.
Figure 6B:
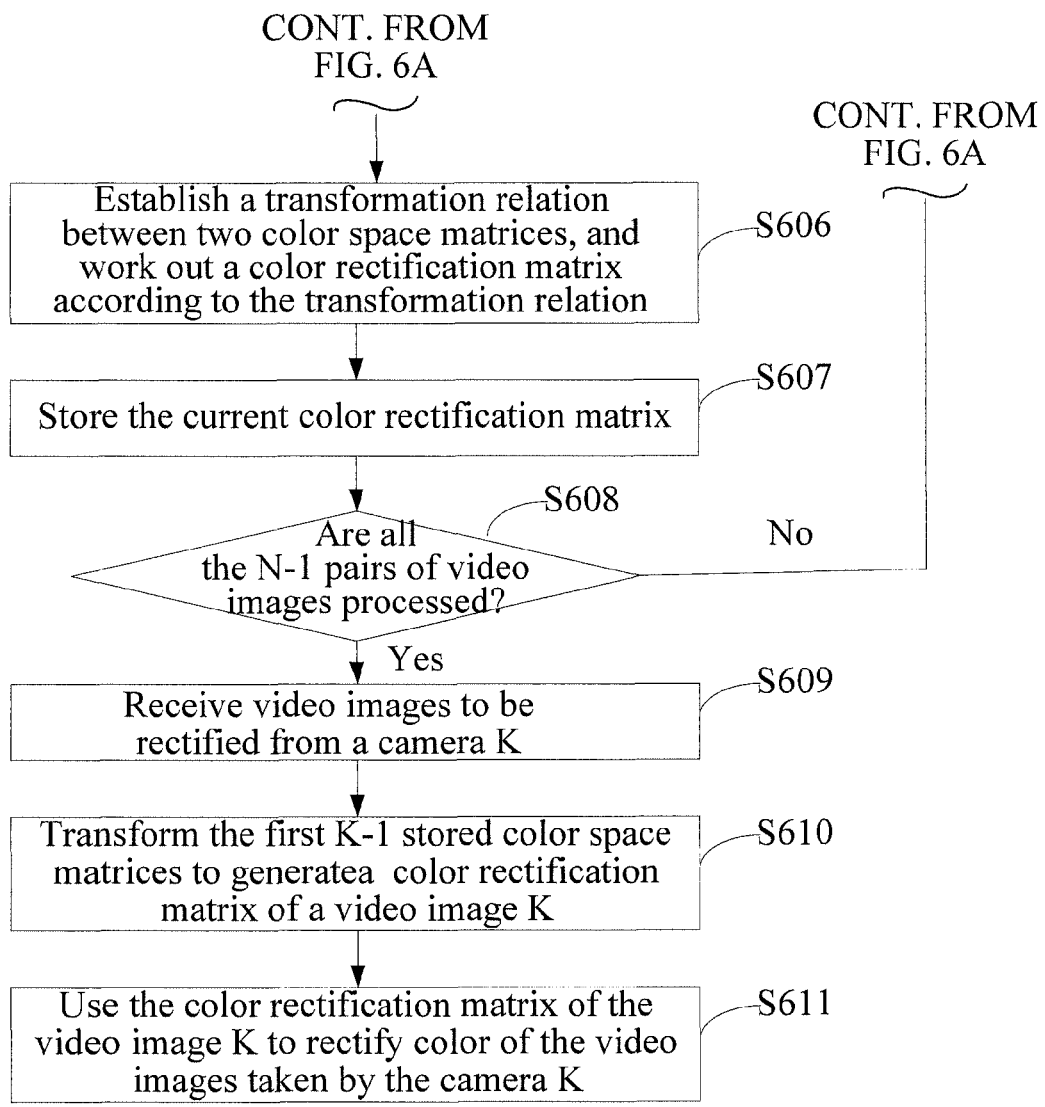

FIGS. 6A and 6B are a flow chart of a color rectification method provided in Embodiment 4 of the present invention. The method includes the following steps:

S601. Receive N video images taken by N cameras, where an overlap region exists between every two adjacent video images among the N video images.

Every two adjacent cameras in the N cameras make up a pair. For example, camera 1 and camera 2 make up a pair, camera 2 and camera 3 make up a pair, and by analogy, camera N−1 and camera N make up a pair. The two cameras in each pair are a source camera and a destination camera respectively, where the source camera takes a source video image, and the destination camera takes a destination video image.

Initially, the positions of the N cameras may be adjusted to generate an overlap region between the source video image and the destination video image taken by each pair of adjacent cameras, regardless of the size of the overlap region. Compared with the rectification based on a histogram in the prior art which requires a large area of overlap, this embodiment does not limit the size of the overlap region.

S602. Preprocess the N video images.

The preprocessing of the video images includes generally applied smooth denoising and distortion rectification. This step is optional, and is covered in the prior art.

S603. Perform color space transformation for the N preprocessed video images.

It is assumed that the video images taken by the cameras are in the RGB format. Color space transformation may be performed for the RGB images. The transformed video images may be in one of the following formats: HSV, YUV, HSL, CIE-Lab, CIE-Luv, CMY, CMYK, and XYZ.

S604. Select matched feature points of N−1 pairs of adjacent video images in sequence.

In the process of performing step 304, the process of obtaining the matched feature points of the N−1 pairs of adjacent video images is similar to step 204 in the previous embodiment.

S605. Create a color space matrix of every two adjacent video images according to the matched feature points.

This step is similar to S505 in the previous embodiment.

S606. Set up a transformation relation between two color space matrices, and work out a color rectification matrix according to the transformation relation.

S607. Store the current color rectification matrix.

Step S604 to step S607 are a process of processing one of N−1 pairs of adjacent video images. This process is the same as step S504 to step S507 described in Embodiment 3 above.

S608. Judge whether all the N−1 pairs of video images are processed; if all the N−1 pairs of video images are processed, proceed to step S609; if not all the N−1 pairs of video images are processed, return to step S604.

S609. Receive video images to be rectified from a camera K.

Through the foregoing steps, N−1 color rectification matrices have been calculated out. It is assumed that the first pair of video images corresponds to the first color rectification matrix (Mat_1), and the second pair of video images corresponds to the second color rectification matrix (Mat_2), and by analogy, pair N−1 corresponds to color rectification matrix N−1 (Mat_N−1).

S610. Transform the stored first K−1 color rectification matrices to generate a color rectification matrix of a video image K.

Color rectification matrix 1 to color rectification matrix K−1 are multiplied in tandem to generate the color rectification matrix of the video image input by the camera K, namely, generate Mat_(k), where Mat_(k)=Mat_1×Mat_2 . . . ×Mat_(k−1).

S611. Use the color rectification matrix of the video image K to rectify color of the video images taken by the camera K.

Mat_(k) is multiplied by the color space matrix of the video image to be rectified, the multiplication result is used as a color space matrix of the rectified video image, and the rectified video image is generated according to the color space matrix of the rectified video image.

In this embodiment of the present invention, color rectification is performed for the video images. The overlap region between two adjacent images is required only at the time of calculating the color rectification matrix. In the rectification process, color rectification can be performed through the color rectification matrix no matter whether any overlap region exists between the video images. Moreover, the color rectification matrix needs to be generated only once, which saves time of rectifying color of the video images.

Embodiment 5

Figure 7A:
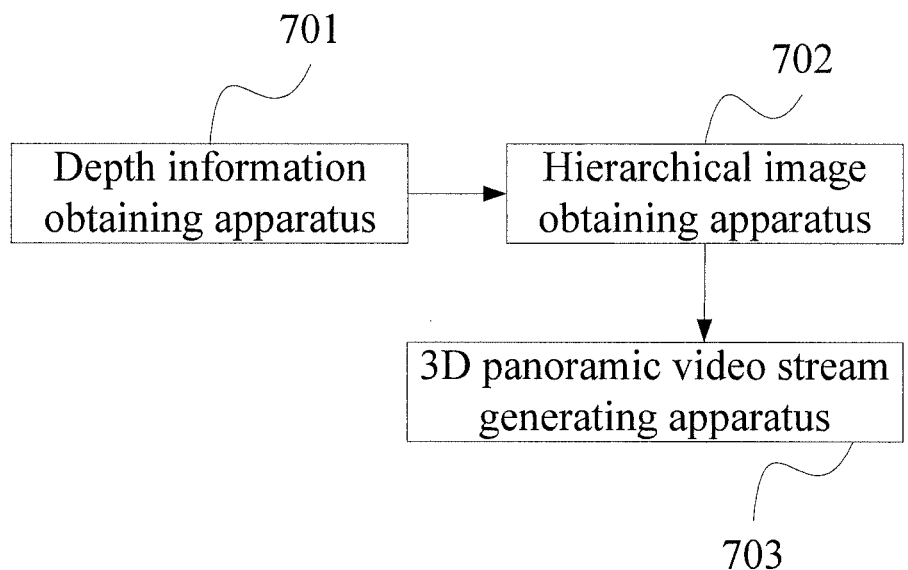
FIG. 7A shows a structure of a device for generating 3D panoramic video streams according to Embodiment 5 of the present invention.

FIG. 7A shows a structure of a device for generating 3D panoramic video streams according to Embodiment 5 of the present invention. The device includes: a depth information obtaining apparatus 701, configured to obtain depth information of at least two video images to be stitched; a hierarchical image obtaining apparatus 702, configured to obtain image data in multiple depth positions from a corresponding video image to be stitched according to the depth information of each video image to be stitched; and a 3D panoramic video stream generating apparatus 703, configured to stitch data of the video images according to the obtained image data in multiple depth positions, and generate 3D panoramic video streams.

As shown in FIG. 1, the depth cameras (111B, 112B) obtain video streams of the site B and depth information of each image from two viewpoints synchronously, and obtain depth images in different depth positions according to the depth information of the image. For the area with a little change of depth, the image stitching is performed once; for persons and objects that are moving, it is necessary to stitch each frame in real time.

Figure 7B:
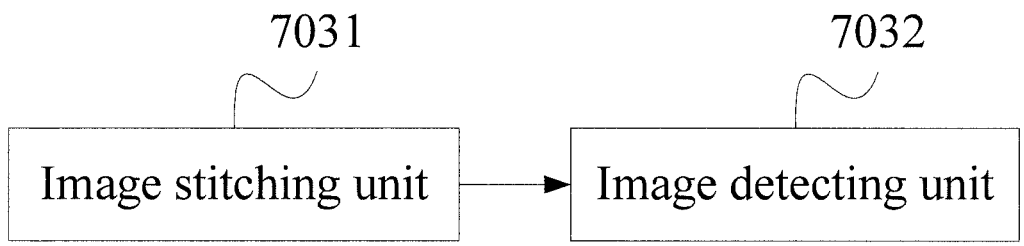
FIG. 7B is a structural block diagram of an apparatus for generating 3D panoramic video streams according to Embodiment 5 of the present invention.

The hierarchical image obtaining apparatus 702 obtains person image data from a corresponding video image according to the depth information of each video image, and obtains non-person image data from the corresponding video image according to the depth information of each video image. As shown in FIG. 7B, the 3D panoramic video stream generating apparatus 703 includes an image stitching unit 7031 and an image detecting unit 7032. The image stitching unit 7031 stitches non-person image data to generate stitched non-person image data, stitches person image data to generate stitched person image data, and bonds the stitched person image data to the stitched non-person image data to generate 3D panoramic video streams. The image detecting unit 7032 detects an image change region of data of each person image in the current frame compared with data of this person image in the previous frame of each video stream; if it is determined that the image change region is less than a set threshold, the image stitching unit 7031 stitches only the person image data in the image change region.

The hierarchical image obtaining apparatus 702 obtains foreground image data from the corresponding video image according to the depth information of each video image, and obtains background image data from the corresponding video image according to the depth information of each video image. The 3D panoramic video stream generating apparatus 703 includes an image stitching unit 7031 and an image detecting unit 7032. The image stitching unit 7031 stitches the obtained background image data to generate background panoramic image data, stitches the obtained foreground image data to generate stitched foreground image data, and bonds the stitched foreground image data to the background panoramic image data to generate 3D panoramic video streams. The image detecting unit 7032 detects the video image change region of the foreground image data in the current frame compared with the foreground image data in the previous frame of each video stream; if it is determined that the image change region is less than a set threshold, the image stitching unit 7031 stitches only the foreground image data in the image change region.

The technical solution provided in this embodiment of the present invention implements fast and real-time stitching of video images, simplifies the stitching of video images, improves efficiency of stitching video images, provides users with 3D panoramic seamless high-resolution conferences, enables the users to enjoy more advanced and authentic experience than the traditional telepresence, and overcomes ghosts caused by parallax in multi-viewpoint video stitching, especially when the close-shot parallax is noticeable.

Embodiment 6

Figure 8A:
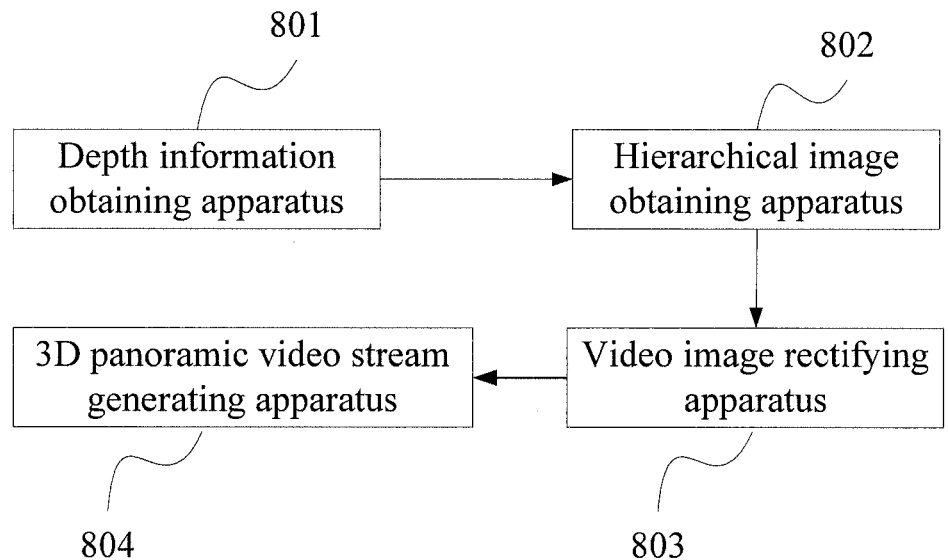
FIG. 8A shows a structure of a device for generating 3D panoramic video streams according to Embodiment 6 of the present invention.

FIG. 8A shows a structure of a device for generating 3D panoramic video streams according to Embodiment 6 of the present invention. The device includes a depth information obtaining apparatus 801, a hierarchical image obtaining apparatus 802, a video image rectifying apparatus 803, and a 3D panoramic video stream generating apparatus 804. The depth information obtaining apparatus 801 and the hierarchical image obtaining apparatus 802 are similar to those described in Embodiment 5 above.

Figure 8B:
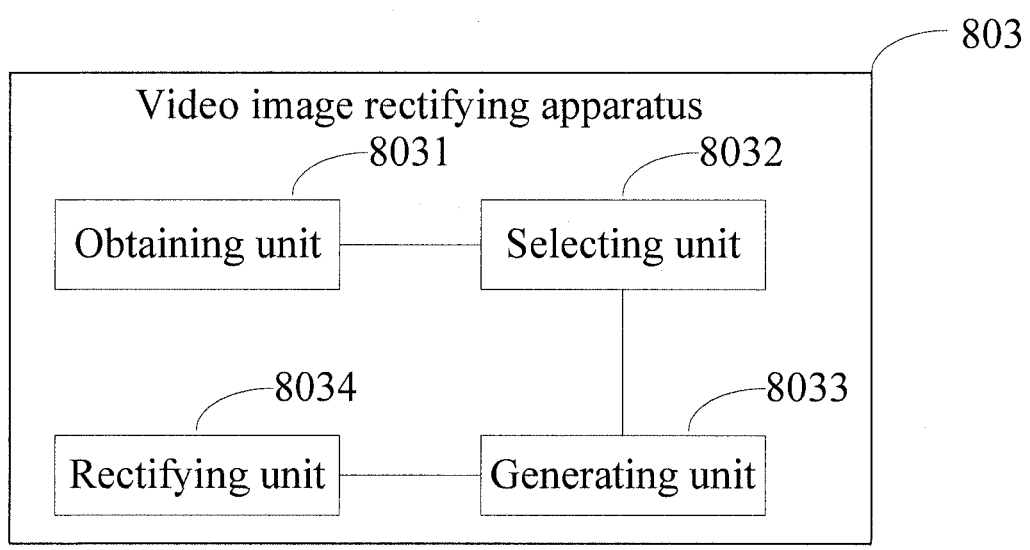
FIG. 8B shows a structure of a video image rectifying apparatus according to Embodiment 6 of the present invention.

The video image rectifying apparatus 803 includes an obtaining unit 8031, a selecting unit 8032, a generating unit 8033, and a rectifying unit 8034 (as shown in FIG. 8B).

The obtaining unit 8031 is configured to obtain at least two video images to be rectified, where an overlap region exists between every two adjacent video images among the at least two video images to be rectified. The obtaining unit 8031 may be a videorecording device such as videorecorder and camera. The selecting unit 8032 is configured to select matched feature points of every two adjacent video images to be rectified from the overlap region. The selecting unit 8032 may be a processor-specific chip capable of extracting and matching feature points of images, or a universal processor chip, and works based on an algorithm for extracting and matching feature points of images. The generating unit 8033 is configured to generate a color rectification matrix of every two adjacent video images to be rectified according to the matched feature points. The generating unit 8033 may be a Complex Programmable Logic Device (CPLD) capable of processing matrices, or a Field Programmable Gate Array (FPGA). The rectifying unit 8034 is configured to use the color rectification matrix to rectify the received video images to be stitched.

Figure 9A:
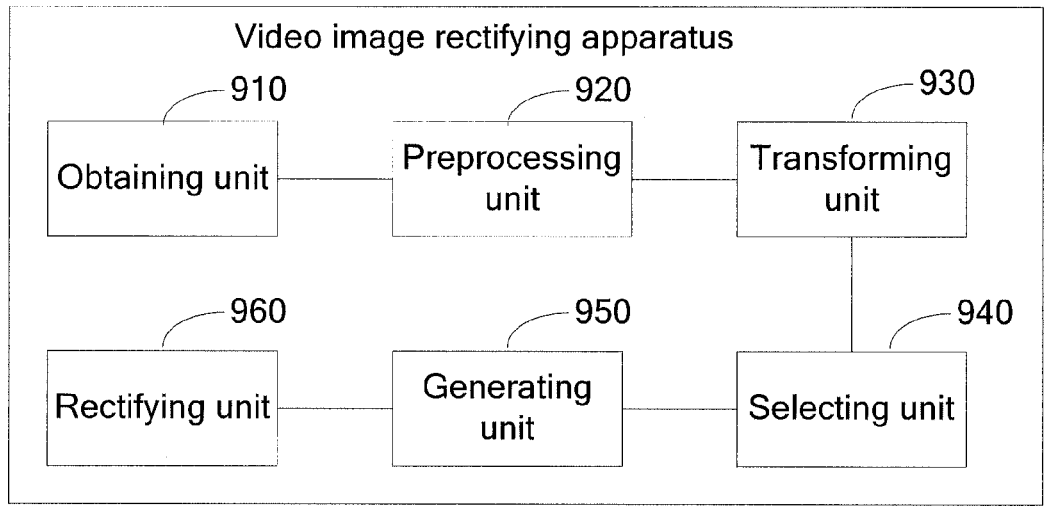
FIG. 9A shows a structure of another video image rectifying apparatus according to Embodiment 6 of the present invention.
Figure 9B:
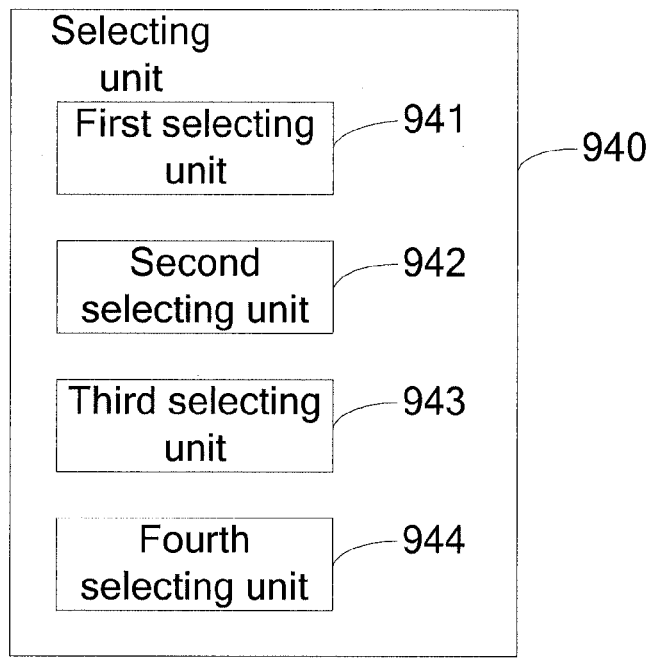
FIG. 9B shows a structure of a selecting unit according to Embodiment 6 of the present invention.

FIG. 9B shows a video image rectifying apparatus according to Embodiment 2 of the present invention. The apparatus includes an obtaining unit 910, a preprocessing unit 920, a transforming unit 930, a selecting unit 940, a generating unit 950, and a rectifying unit 960.

The obtaining unit 910 is configured to obtain at least two video images to be rectified, where an overlap region exists between every two adjacent video images among the at least two video images to be rectified. The obtaining unit 910 may be a videorecording device such as videorecorder and camera. The preprocessing unit 920 is configured to preprocess at least two video images to be rectified after the obtaining unit obtains the at least two video images to be rectified. The preprocessing includes smooth denoising and/or distortion rectification. The preprocessing unit 920 is optional. The transforming unit 930 is configured to perform color space transformation for the at least two video images to be rectified. The video images to be rectified before and after the transformation may be in one of the following formats: RGB, HSV, YUV, HSL, CIE-Lab, CIE-Luv, CMY, CMYK, and XYZ. The selecting unit 940 is configured to select matched feature points of every two adjacent video images to be rectified from the overlap region. The generating unit 950 is configured to generate a color rectification matrix of every two adjacent video images to be rectified according to the matched feature points. The rectifying unit 960 is configured to use the color rectification matrix to rectify the received video images to be stitched.

Specifically, as shown in FIG. 9B, the selecting unit 940 includes at least one of the following units: a first selecting unit 941, configured to detect SIFT feature points in the overlap region, and match the detected feature points to obtain multiple pairs of matched feature points of the two adjacent video images to be rectified; a second selecting unit 942, configured to: detect SIFT feature points in the overlap region, match the detected feature points to obtain multiple pairs of matched feature points of two adjacent video images to be rectified, find regions of the same area by pivoting on the matched feature points, and assign the mean value of the color features of the found regions to the matched feature points; a third selecting unit 943, configured to: split the overlap region of the two video images, use the corresponding regions in the split overlap region of the two video images to be rectified as matched feature points, and assign the mean value of color features of the corresponding regions to the matched feature points; and a fourth selecting unit 944, configured to receive region blocks which are manually selected from the overlap region, use the corresponding selected region blocks of the two video images to be rectified as matched feature points, and assign the mean value of color features of the corresponding region blocks to the matched feature points. It should be noted that, for clearer illustration, the selecting unit 940 in FIG. 9B includes all the four units described above. In practice, the selecting unit 940 needs to include at least one of the four units.

Figure 9C:
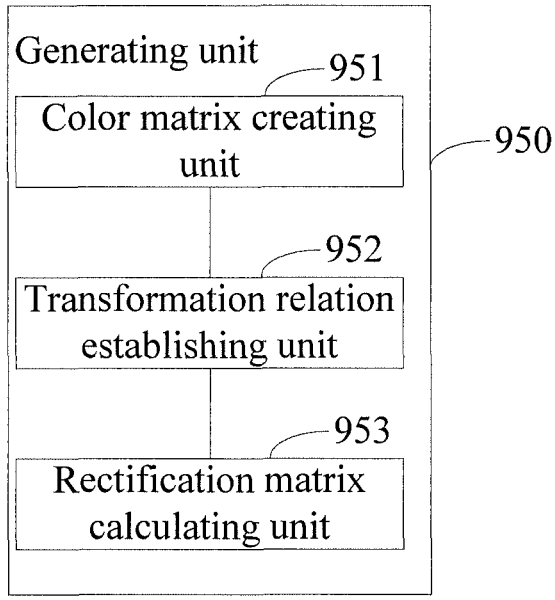
FIG. 9C shows a structure of a generating unit according to Embodiment 6 of the present invention.

Specifically, as shown in FIG. 9C, it is assumed that, in every two adjacent video images to be rectified, one is a source video image, and the other is a destination video image. The generating unit 950 may include: a color matrix creating unit 951, configured to create a color space matrix of the source video image and a color space matrix of the destination video image, where each row of the color space matrix represents color space attributes of one of the matched feature points; a transformation relation establishing unit 952, configured to establish a matrix transformation relation between the color space matrix of the source video image and the color space matrix of the destination video image, where transformation relation is: the color space matrix of the source video image is multiplied by the color rectification matrix, and a multiplication result plus an error amount is the color space matrix of the destination video image; and a rectification matrix calculating unit 953, configured to calculate the color rectification matrix when the error amount is the smallest according to the transformation relation.

Figure 9D:
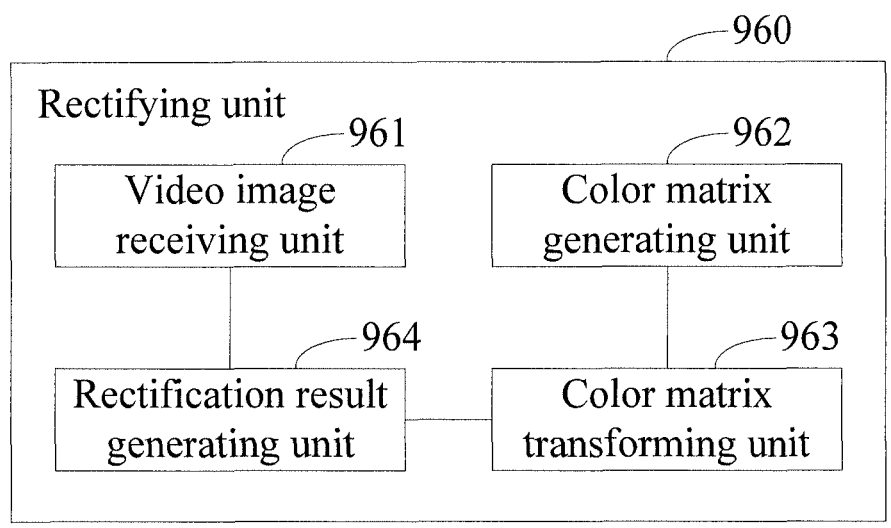
FIG. 9D shows a structure of a rectifying unit according to Embodiment 6 of the present invention.

Specifically, as shown in FIG. 9D, in the case that the obtaining unit 910 obtains two video images to be rectified, the rectifying unit 960 may include: a video image receiving unit 961, configured to receive a video image to be rectified from an inputting apparatus which inputs a source video image, for example, receive a video image to be stitched; a color matrix generating unit 962, configured to generate a color space matrix of the video image to be rectified; a color matrix transforming unit 963, configured to multiply the color rectification matrix by the color space matrix of the video image to be rectified, and use the multiplication result as a color space matrix of the rectified video image; and a rectification result generating unit 964, configured to generate the rectified video image according to the color space matrix of the rectified video image.

Figure 9E:
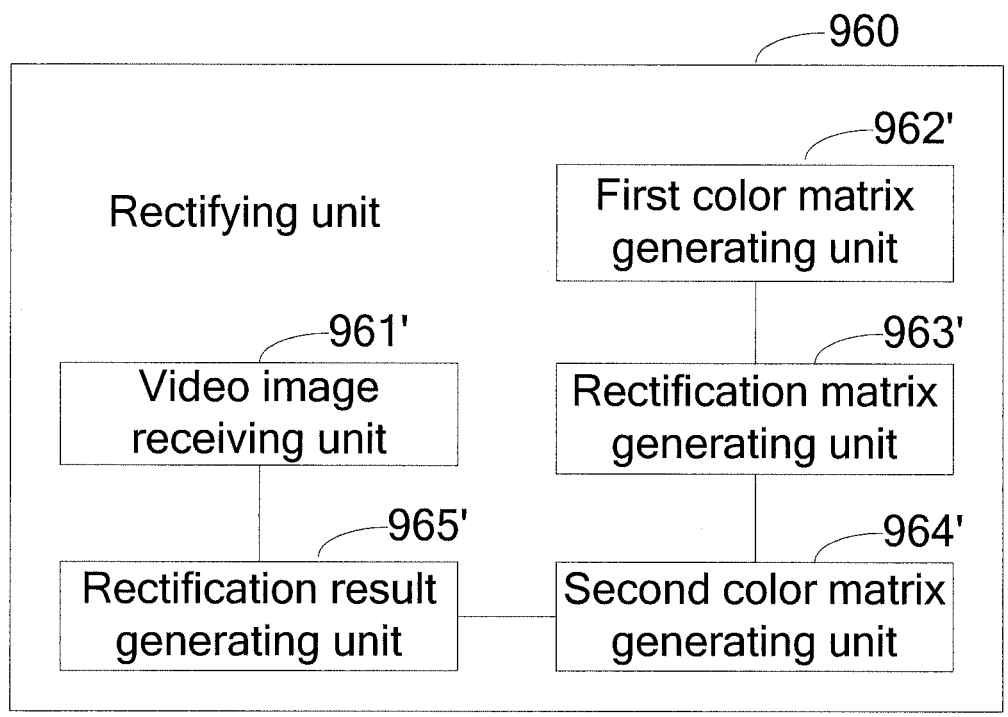
FIG. 9E shows a structure of another rectifying unit according to Embodiment 6 of the present invention.

Specifically, as shown in FIG. 9E, in the case that the obtaining unit 910 obtains N video images to be rectified that are adjacent in tandem, where N is a natural number greater than 2, the N video images include N−1 pairs of adjacent video images to be rectified, and each pair of video images to be rectified corresponds to a color rectification matrix. The rectifying unit 660 may include: a video image receiving unit 961', configured to receive a video image to be rectified from an inputting apparatus, where the video image to be rectified is a video image K among the N video images; a first color matrix generating unit 96T, configured to generate a color space matrix of the video image to be rectified; a rectification matrix generating unit 963', configured to multiply color rectification matrix 1 to color rectification matrix K−1 in tandem to generate a color rectification matrix of the video image to be rectified; a second color matrix generating unit 964', configured to multiply the color rectification matrix by the color space matrix of the video image to be rectified, and use the multiplication result as the color space matrix of the rectified video image; and a rectification result generating unit 965, configured to generate the rectified video image according to the color space matrix of the rectified video image.

The following describes a color rectification process put forward in this embodiment in a scenario that five cameras transmit five adjacent video images. It is assumed that the five video images are F1, F2, F3, F4, and F5, every two adjacent video images make up a pair, namely, F1 and F2 make up a pair which is represented by Z1, F2 and F3 make up a pair which is represented by Z2, F3 and F4 make up a pair which is represented by Z3, and F4 and F5 make up a pair which is represented by Z4.

The color rectification matrices are calculated out according to step S504 to step S507 according to Embodiment 3 above. The color rectification matrix of Z1 is Mat_1, the color rectification matrix of Z2 is Mat_2, the color rectification matrix of Z3 is Mat_3, and the color rectification matrix of Z4 is Mat_4.

Because color rectification matrix 1 to color rectification matrix K−1 can be multiplied to generate the color rectification matrix of the video image input by a camera K, the color rectification matrix corresponding to the image taken by the second camera is Mat_2'=Mat_1; the color rectification matrix corresponding to the image taken by the third camera is Mat_3'=Mat_1×Mat_2; the color rectification matrix corresponding to the image taken by the fourth camera is Mat_4'=Mat_1×Mat_2×Mat_3; the color rectification matrix corresponding to the image taken by the fifth camera is Mat_5'=Mat_1×Mat_2×Mat_3×Mat_4.

Therefore, for the purpose of rectifying the image taken by the second camera, it is necessary only to multiply the color rectification matrix Mat_2' by the color space matrix of the image; for the purpose of rectifying the image taken by the third camera, it is necessary only to multiply the color rectification matrix Mat_3' by the color space matrix of the image; for the purpose of rectifying the image taken by the fourth camera, it is necessary only to multiply the color rectification matrix Mat_4' by the color space matrix of the image; and, for the purpose of rectifying the image taken by the fifth camera, it is necessary only to multiply the color rectification matrix Mat_5' by the color space matrix of the image.

Embodiment 7

Figure 10:
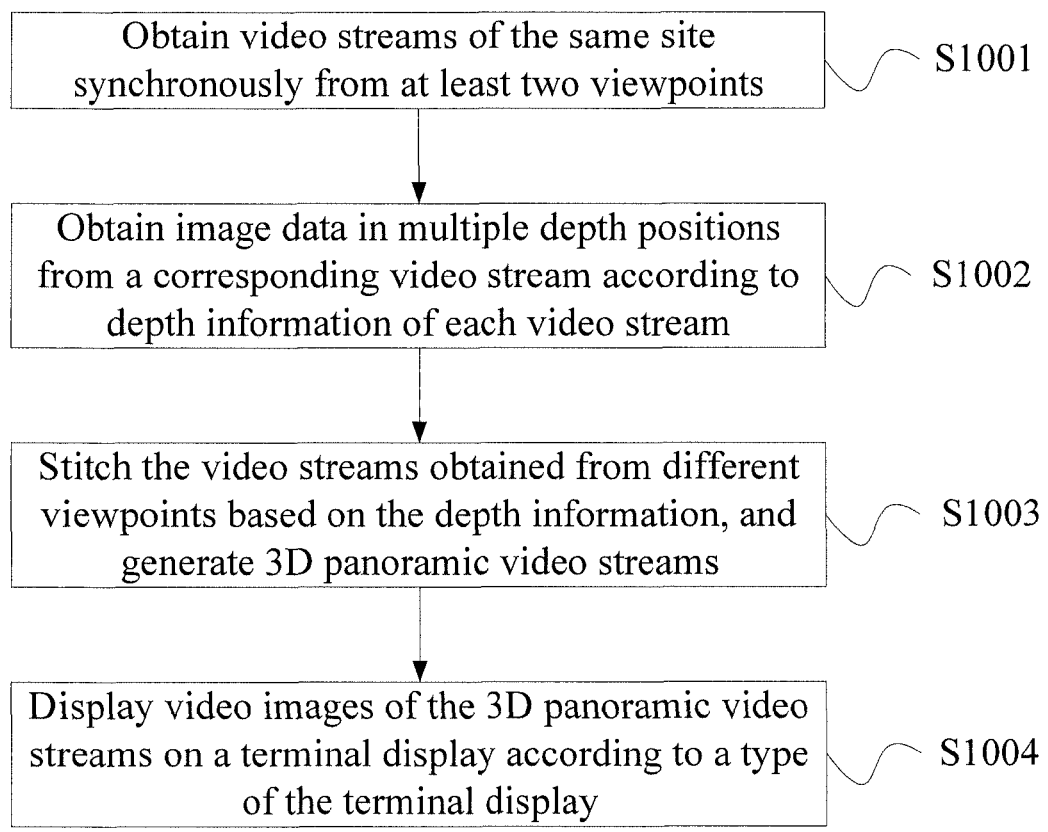
FIG. 10 is a flow chart of a 3D panoramic videoconference method according to Embodiment 7 of the present invention.

FIG. 10 is a flow chart of a 3D panoramic videoconference method according to Embodiment 7 of the present invention. The method includes the following steps:

S1001. Obtain video streams of the same site synchronously from at least two viewpoints.

S1002. Obtain image data in multiple depth positions from a corresponding video stream according to depth information of each video stream.

S1003. Stitch the video streams obtained from different viewpoints based on the depth information, and generate 3D panoramic video streams.

S1004. Display video images of the 3D panoramic video streams on a terminal display according to a type of the terminal display.

Figure 11:
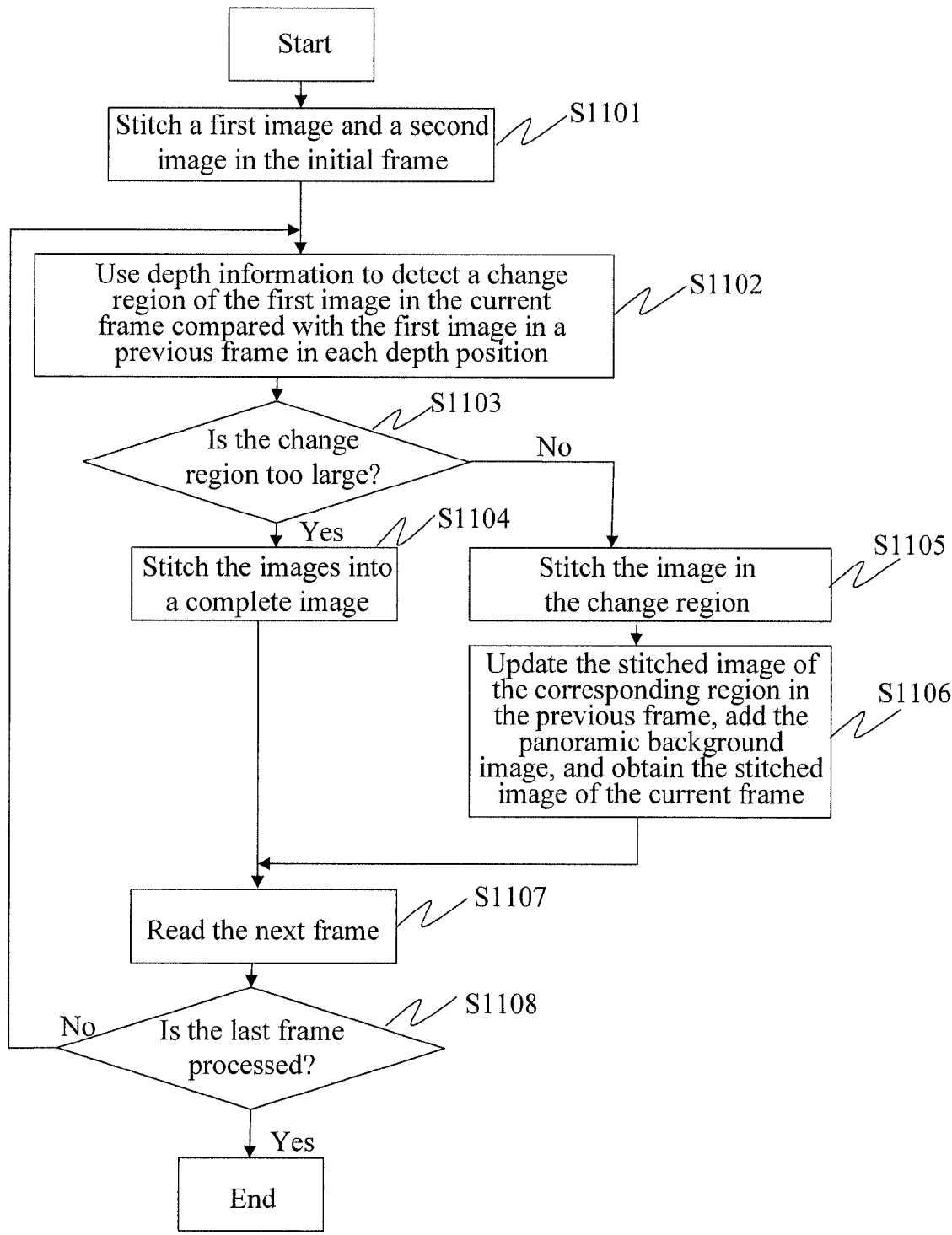
FIG. 11 is a video stitching flow chart according to Embodiment 7 of the present invention.

FIG. 11 is a video stitching flow chart according to Embodiment 7 of the present invention. The video stitching process includes the following steps:

Step S1101. Perform video stitching for the initial frame to calculate out a complete stitched image, and stitch the first image and the second image of the initial frame.

Step S1102. For the subsequent video sequence, detect a change region of the first image in a current frame compared with the first image in a previous frame.

Step S1103. Determine whether the change region is too large. If the result of the determination is too large, execute S1104. If the result of the determination is small, execute S1105.

Step S1104. Calculate a complete stitched image of the current frame if the change region is too large, and execute S1107.

Step S1105. Perform video stitching only for the change region, and calculate out a local stitched image.

Step S1106. Use the local image to update the change region of the current frame compared with the previous frame or the initial frame, and generate a stitched image of the current frame.

Step S1107. Read the next frame.

Step S1108. Judge whether the frame is the last frame; if the frame is the last frame, end the process; if the frame is not the last frame, proceed to step S1102.

The image sequences are generally correlated with each other, and the region that changes is only a part of the scene. Therefore, this algorithm simplifies the calculation of video stitching significantly. In this way, a complex algorithm may be applied to video stitching, and an accurate stitched panoramic video can be obtained when the videos are stitched in real time.

In the foregoing solution, the change region is calculated by comparing the current frame with the previous frame. In a relatively fixed scene such as conference scene, the change region may be calculated by comparing the current frame with the initial frame.

Figure 12:
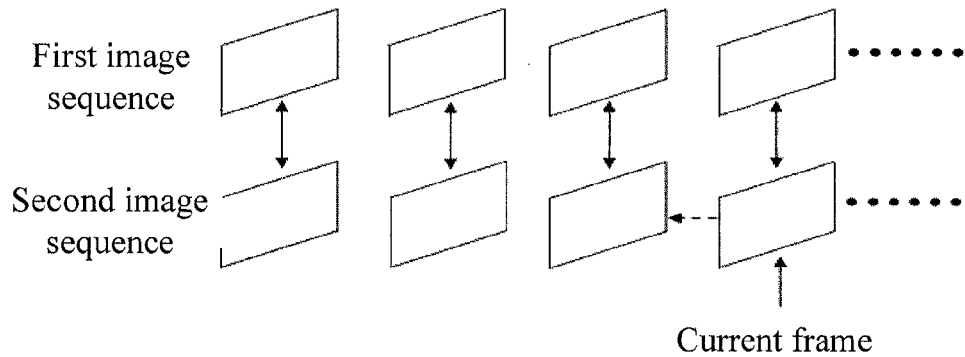
FIG. 12 shows a schematic diagram of two video image sequences according to Embodiment 7 of the present invention.

The cameras shown in FIG. 1 can be used to obtain the first image sequence and the second image sequence shown in FIG. 12. A video sequence is a result of stitching an image in the first image sequence with a corresponding image in the second image sequence, obtaining a stitched image of each image pair, performing 3D coding for the stitched image, and outputting the coded image. The display type of a terminal is determined. If the display device of the terminal is a 2D display, the terminal displays 2D image information of the synthesized video image; if the display device of the terminal is a 3D display, the terminal displays 3D image information of the synthesized video image; and, if the display device of the terminal is a multi-layer display, the terminal displays image information in multiple depth positions of the synthesized video image.

This embodiment of the present invention provides users with high-resolution 3D panoramic seamless conferences, overcomes ghosts caused by parallax in multi-viewpoint video stitching, especially when the close-shot parallax is noticeable, and enables different display modes for different display devices. A multi-layer display can be used to display the foreground and the background respectively and offer good 3D experience. In addition, a 3D display or 2D display can be used to offer better 3D presence of higher precision.

Embodiment 8

Figure 13A:
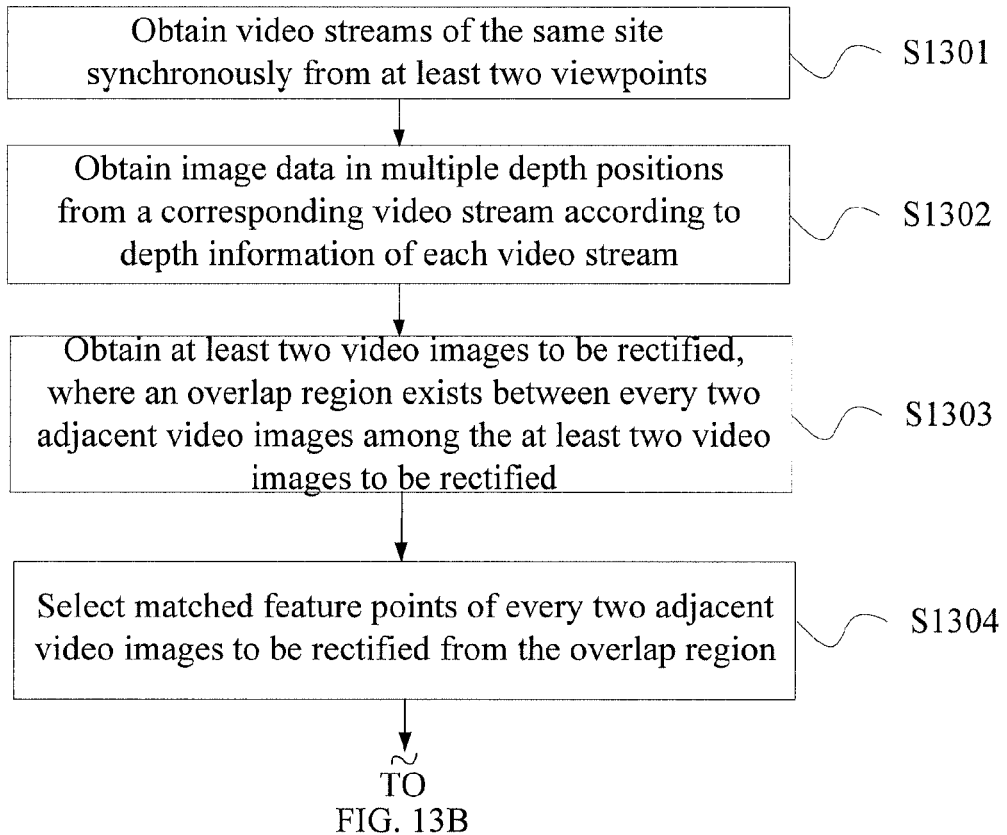
FIGS. 13A and 13B are a flow chart of a 3D panoramic videoconference method according to Embodiment 8 of the present invention.
Figure 13B:
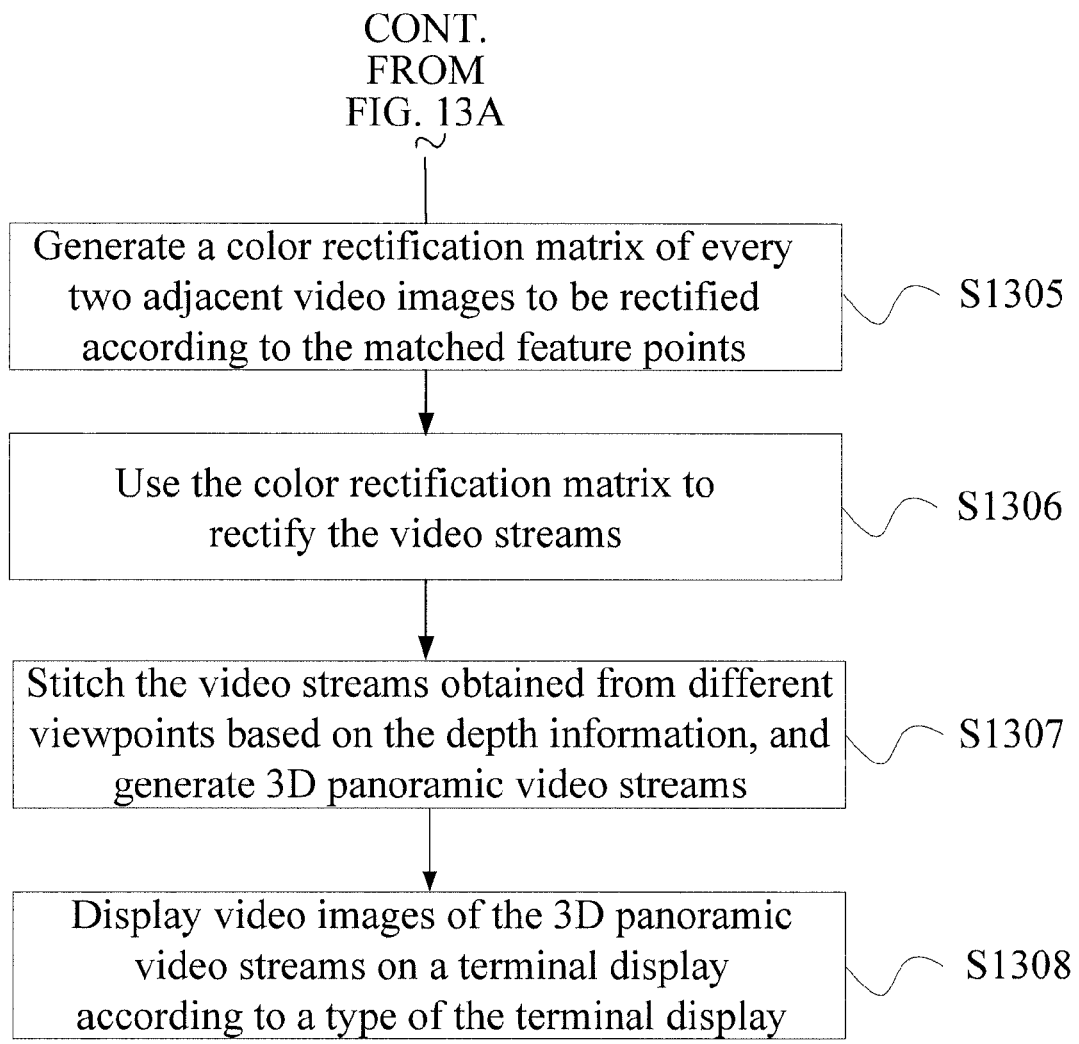

FIGS. 13A and 13B are a flow chart of a 3D panoramic videoconference method according to Embodiment 8 of the present invention. The method includes the following steps:

S1301. Obtain video streams of the same site synchronously from at least two viewpoints.

S1302. Obtain image data in multiple depth positions from a corresponding video stream according to depth information of each video stream.

Steps S1301 to S1302 are the same as the corresponding steps described in Embodiment 7.

S1303. Obtain at least two video images to be rectified, where an overlap region exists between every two adjacent video images among the at least two video images to be rectified.

S1304. Select matched feature points of every two adjacent video images to be rectified from the overlap region.

S1305. Generate a color rectification matrix of every two adjacent video images to be rectified according to the matched feature points.

S1306. Use the color rectification matrix to rectify the video streams.

Steps S1303 to S1306 are a process of rectifying color of the obtained video streams.

It should be noted that the color rectification matrix needs to be generated only once. If color rectification needs to be performed for different video images to be stitched later, it is necessary only to perform step S1306 directly without repeating steps S1303 to S1305.

Therefore, in this embodiment of the present invention, steps S1303 to S1305 may occur before step S1301 to obtain the color rectification matrix.

S1307. Stitch the rectified video streams obtained from different viewpoints based on the depth information, and generate 3D panoramic video streams.

S1308. Display video images of the 3D panoramic video streams on a terminal display according to a type of the terminal display.

Embodiment 9

Figure 14:
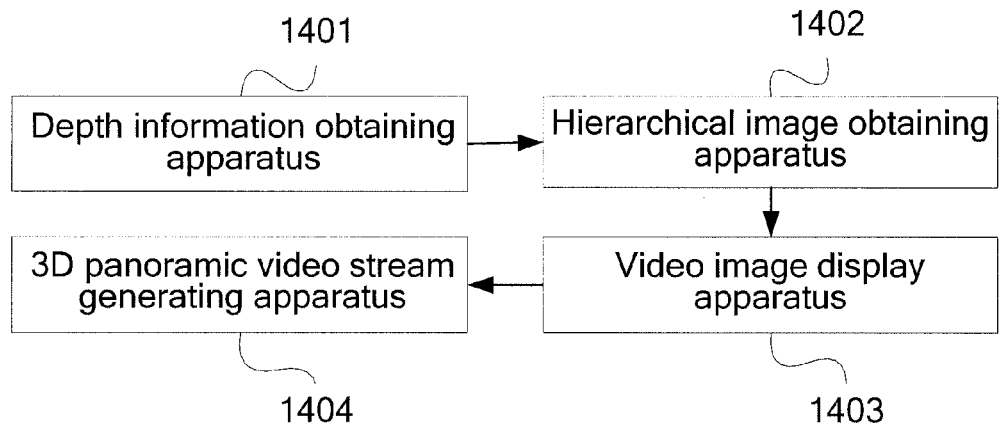
FIG. 14 shows a structure of a 3D panoramic videoconference device according to Embodiment 9 of the present invention.

FIG. 14 shows a structure of a 3D panoramic videoconference device according to Embodiment 9 of the present invention. The device includes: a depth information obtaining apparatus 1401, configured to obtain video streams of the same site synchronously from at least two viewpoints; a hierarchical image obtaining apparatus 1402, configured to obtain image data in multiple depth positions from a corresponding video stream according to depth information of each video stream; a 3D panoramic video stream generating apparatus 1403, configured to stitch the video streams obtained from different viewpoints based on the depth information, and generate 3D panoramic video streams; and a video image display apparatus 1404, configured to display video images of the 3D panoramic video streams on a terminal display according to a type of the terminal display.

Figure 15A:
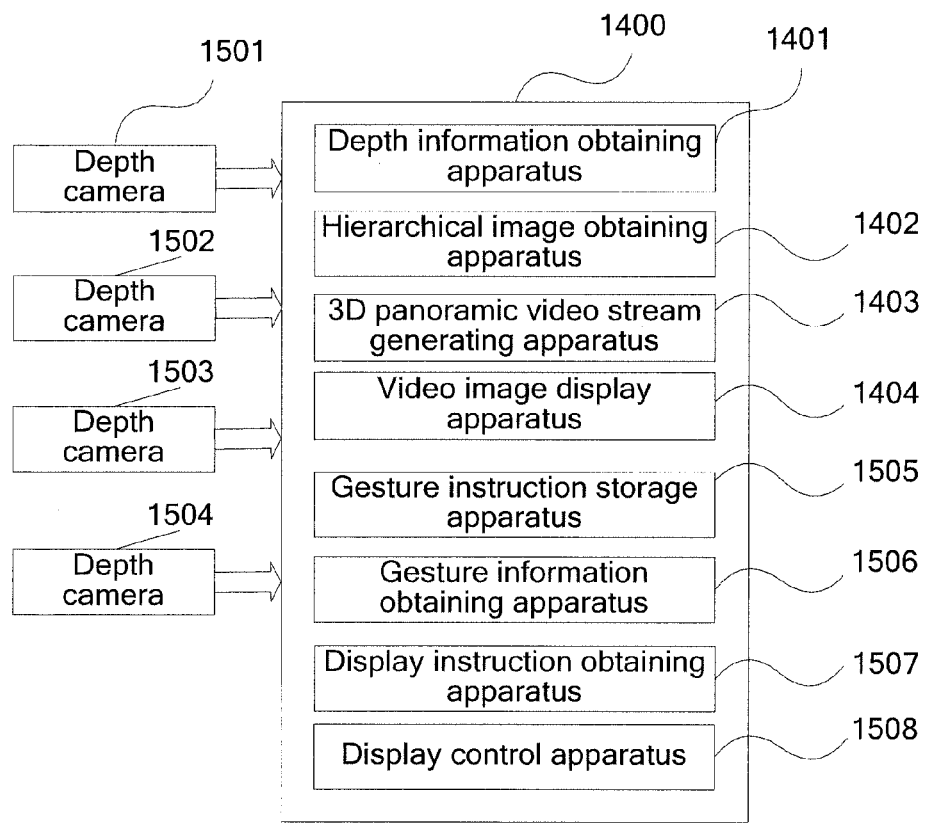
FIG. 15A is a structural block diagram of a 3D panoramic videoconference system according to Embodiment 9 of the present invention.

As shown in FIG. 15A, depth cameras (1501, 1502, 1503, 1504) are connected to a 3D panoramic videoconference device 1400, and the depth information obtaining apparatus 1401 receives video streams obtained from four viewpoints of the same site synchronously. The hierarchical image obtaining apparatus 1402 obtains image data in multiple depth positions from a corresponding video stream according to depth information of each video stream. The 3D panoramic video stream generating apparatus 1403 stitches the video streams obtained from different viewpoints based on video image depth information, obtains a stitched 3D video sequence, encodes the stitched 3D video sequence, and generates 3D panoramic video streams. The video image display apparatus 1404 is configured to display video images of the 3D panoramic video streams on a terminal display according to a type of the terminal display.

The 3D panoramic videoconference device 1400 further includes a gesture instruction storing apparatus 1505, which is configured to store a mapping relation between gesture information and display control instructions; a display instruction obtaining apparatus 1506, which is configured to obtain the display control instruction corresponding to the obtained gesture information according to the mapping relation; a display instruction obtaining apparatus 1507, which is configured to obtain the display control instruction corresponding to the obtained gesture information according to the mapping relation; and a display control apparatus 1508, which is configured to control display activities of the terminal display according to the obtained display control instruction.

Figure 15B:
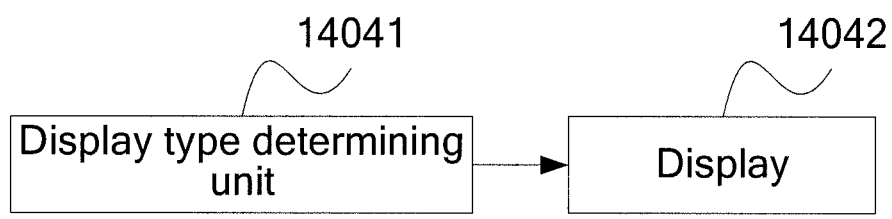
FIG. 15B is a structural block diagram of a video image display apparatus according to Embodiment 9 of the present invention.

As shown in FIG. 15B, the video image display apparatus 1404 includes a display type determining unit 14041 and a display 14042. The display 14042 includes a 2D display, or a 3D display, or a multi-layer display. After the display type determining unit 14041 determines that the terminal display is a 2D display, 3D display, or multi-layer display, if the display 14042 is a 2D display, the terminal displays the 2D image information of synthesized video images; if the display 14042 is a 3D display, the terminal displays the 3D image information of synthesized video images; if the display 14042 is a multi-layer display, the terminal displays the image information in multiple depth positions of synthesized video images.

Figure 16:
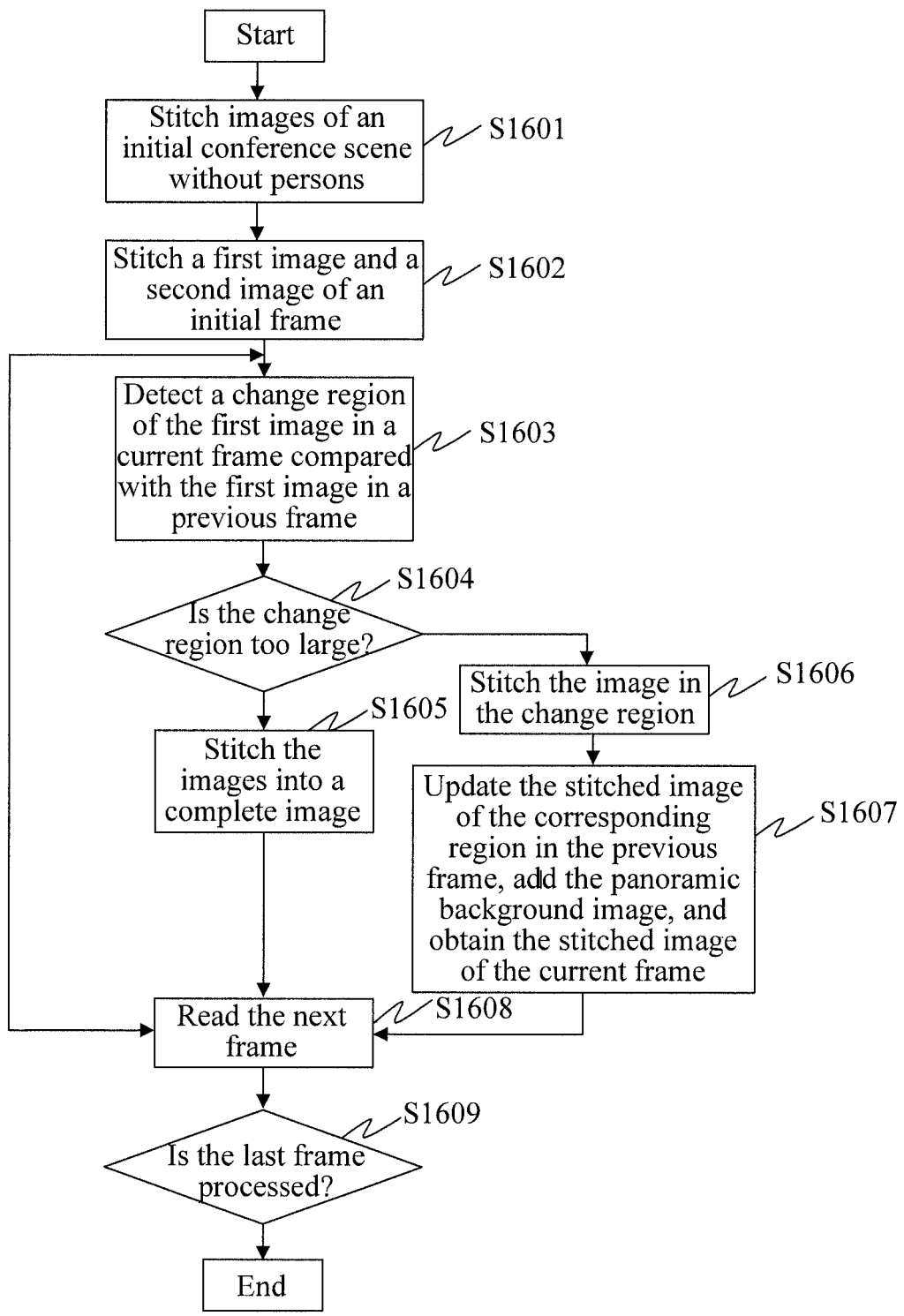
FIG. 16 is a flow chart of a fast video stitching method according to Embodiment 9 of the present invention.

As shown in FIG. 16, a fast video stitching method disclosed in this embodiment of the present invention includes the following steps:

S1601. Use two or more cameras to photograph the background of the conference scene beforehand, stitch the background image of the site without participants, and store the panoramic image and the conference background image of the site.

S1602. Input two or multiple video streams, and stitch the first image and the second image of the initial frame.

S1603. Detect a change region of the first image in a current frame compared with the first image of a previous frame.

S1604. Determine whether the change region is too large. If the result of the determination is yes, go to S1605. If the result of the determination is no, go to S1606.

S1605. Stitch the images into a complete panoramic image if the change region is too large, and go to S1608.

S1606. Stitch the images of the change region into a foreground image of the change region if the change region is not too large, and go to S1607.

S1607. Update the stitched image of the corresponding region in the previous frame, and add the panoramic background image, and go to S1608.

S1608. Read the next frame.

S1609. Judge whether the frame is the last frame; if the frame is the last frame, end the process; if the frame is not the last frame, proceed to step S1603.

The stitched panoramic image is encoded in a 3D mode and output. The display type of the terminal is determined. If the display device of the terminal is a 2D display, the terminal displays 2D image information of the synthesized video image; if the display device of the terminal is a 3D display, the terminal displays 3D image information of the synthesized video image; and, if the display device of the terminal is a multi-layer display, the terminal displays image information in multiple depth positions of the synthesized video image.

This embodiment of the present invention provides users with high-resolution 3D panoramic seamless conferences, overcomes ghosts caused by parallax in multi-viewpoint video stitching, especially when the close-shot parallax is noticeable, and enables different display modes for different display devices. A multi-layer display can be used to display the foreground and the background respectively and offer good 3D experience. In addition, a 3D display or 2D display can be used to offer better 3D presence of higher precision. Moreover, a more user-friendly data coordination mode is put forward, and therefore, the effects of gesture instructions sent by different persons on different sites are displayed on the same display device, and different persons of different sites have the experience of controlling the data and the conference system in the same site position.

In this embodiment, depth cameras are applied to facilitate remote terminal data coordination and conference control of the videoconference or telepresence conference system. Hands, fingers and palms can be recognized according to the depth cameras, and the instructions indicated by the human hand can be recognized.

The gesture identification includes the following steps:

Step 1: Participants of different sites send gesture instructions, and the depth cameras identify the instructions.

Figure 17:
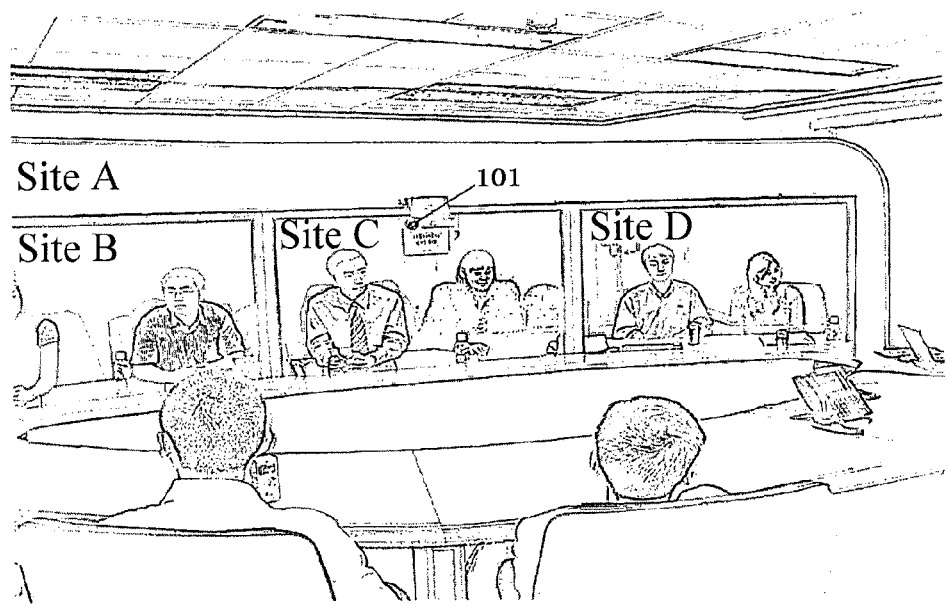
FIG. 17 shows a multi-site multi-viewpoint videoconference system based on depth cameras according to Embodiment 9 of the present invention.

Step 2: The drive effect indicated by the instructions is displayed on a remote terminal device. An application scene here is: a multi-site, 2D/3D/multi-layer, and multi-viewpoint videoconference system composed of depth cameras, as shown in FIG. 17.

Figure 18:
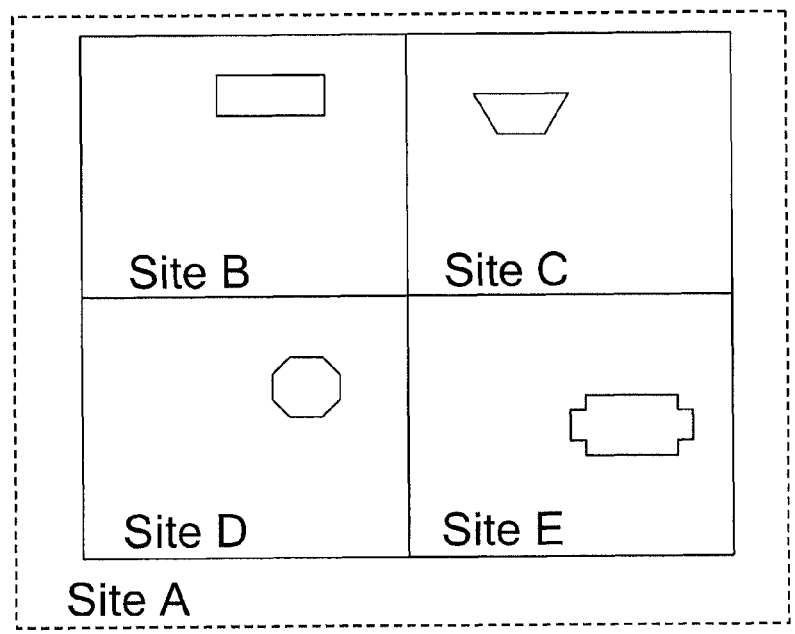
FIG. 18 shows a site A provided in Embodiment 9 of the present invention.

As shown in FIG. 18, the data in sites B, C, D, and E is displayed on the display for displaying data of site A simultaneously.

A data content display mode of the site B can be controlled using gestures. Data content display modes of the site C, site D, and site E can also be controlled using gestures.

Persons in the site A use gestures to control the data content displayed on the site C, and watch desired contents.

Gestures for controlling the data display mode remotely may be defined herein, so as to control and display conference data content between different sites in a friendly way. For example, when the site B controls how its data is displayed on the site A through gestures, the gestures may be common gesture models applied to the local site.

Figure 19:
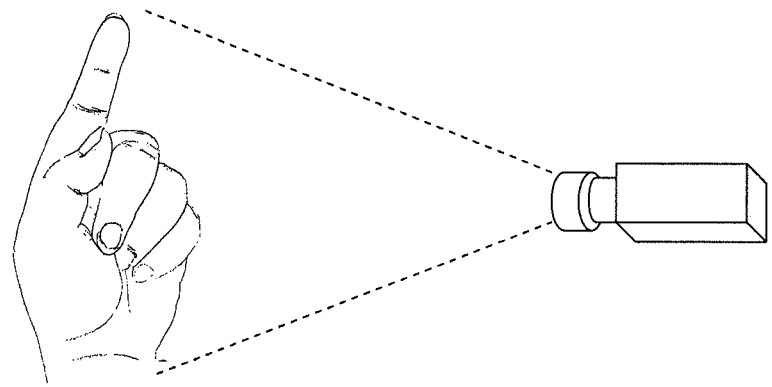
FIG. 19 and FIG. 20 show gesture instructions provided in Embodiment 9 of the present invention.
Figure 20:
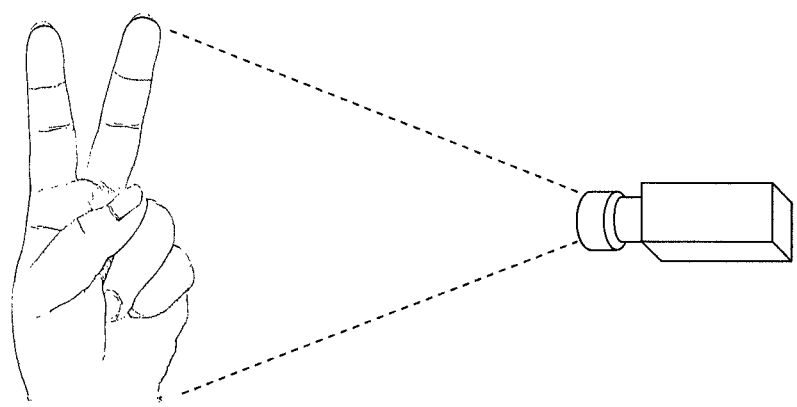

When the persons in the site A use gestures to control the data content displayed on the site C, and watch desired contents, the mapping relation between the gesture and the display control instruction may be defined as:

As shown in FIG. 19, an upright forefinger is a signal of displaying the data of the first site and spotlighting the data of the first site. As shown in FIG. 20, an upright forefinger and an upright middle finger are a signal of displaying the data of the second site and spotlighting the data of the second site.

By analogy, an upright middle finger, an upright ring finer, and an upright little finger are a signal of displaying the data of the third site and spotlighting the data of the third site; if all fingers of a hand are upright except the thumb, it is a signal of displaying the data of the fourth site and spotlighting the data of the fourth site; if the thumb is fixed but other fingers spin, it is a signal of displaying the data of the fifth site, sixth site . . . , in turn, and spotlighting the data of the site indicated when the spin stops; when a person stretch his palm, put up the arm upright and pull the arm back to chest, it is a signal of displaying the data of the spotlighted site in full screen.

In this way, the mapping relation between the gesture information and the display control instruction is stored, the depth cameras photograph the human gestures in the sites and generate gesture information, the display control instruction corresponding to the gesture information is found according to the mapping relation, and the display of the terminal display device is controlled according to the obtained display control instruction. If the display device of the terminal is a 2D display, the terminal displays 2D image information of the synthesized video image; if the display device of the terminal is a 3D display, the terminal displays 3D image information of the synthesized video image; and, if the display device of the terminal is a multi-layer display, the terminal displays image information in multiple depth positions.

The technical solution disclosed in this embodiment of the present invention provides users with 3D panoramic seamless high-resolution conferences, enables the users to enjoy more advanced and authentic experience than the traditional telepresence, overcomes ghosts caused by parallax in multi-viewpoint video stitching, especially when the close-shot parallax is noticeable, provides a fast real-time method of stitching videos, and simplifies video stitching and improves efficiency of video stitching. Moreover, the technical solution enables different display modes for different display devices. A multi-layer display can be used to display the foreground and the background respectively and offer good 3D experience. Also, a 3D display can be used to offer better 3D presence of higher precision. The technical solution also provides a more friendly data coordination mode. Therefore, the effects of gesture instructions sent by different persons on different sites are displayed on the same display device, and different persons of different sites have the experience of controlling the data and the conference system in the same site position.

Embodiment 10

Figure 21:
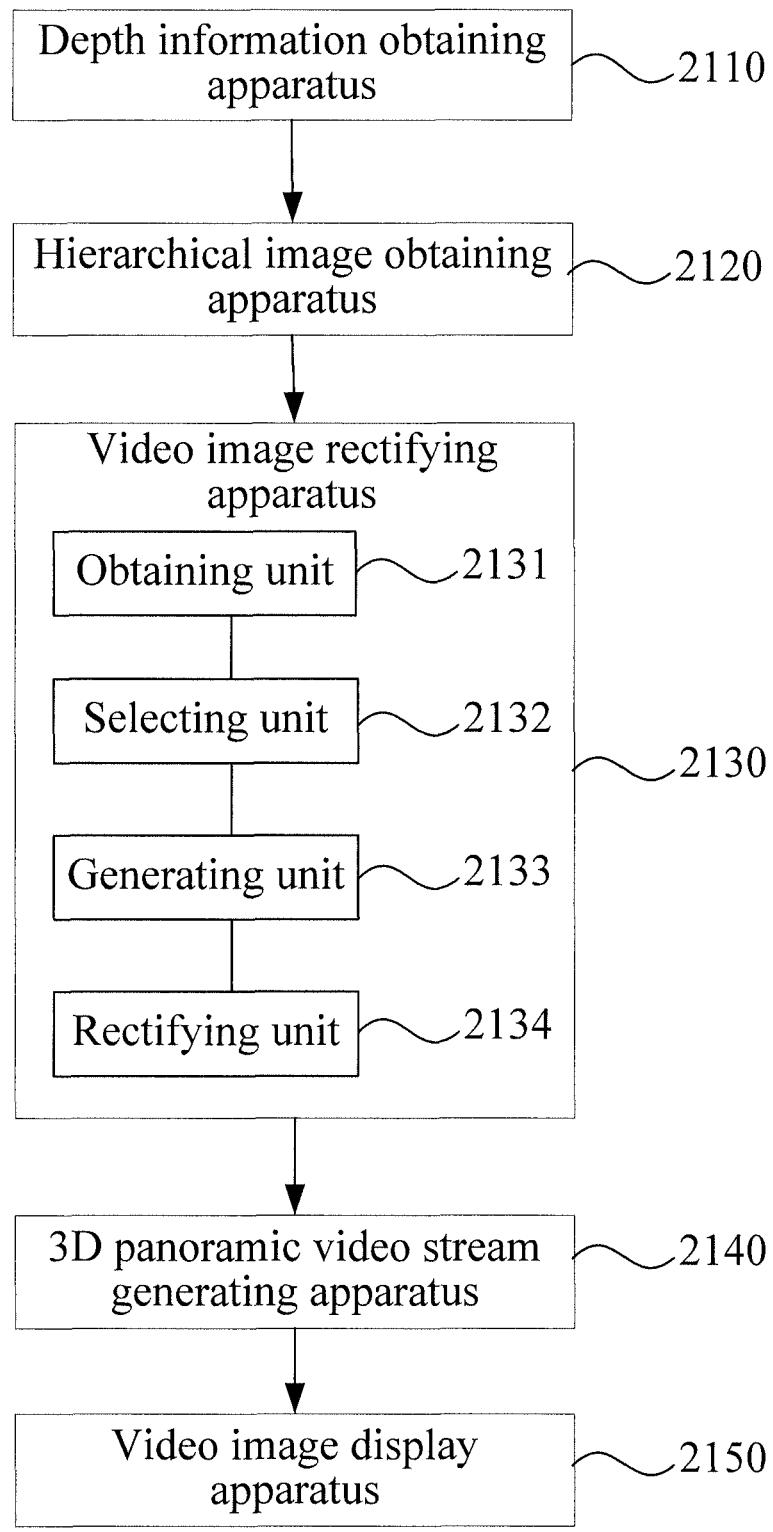
FIG. 21 shows a structure of a 3D panoramic videoconference device according to Embodiment 10 of the present invention.

FIG. 21 shows a structure of a 3D panoramic videoconference device according to Embodiment 10 of the present invention. The device includes a depth information obtaining apparatus 2110, a hierarchical image obtaining apparatus 2120, a video image rectifying apparatus 2130, a 3D panoramic video stream generating apparatus 2140, and a video image display apparatus 2150. The depth information obtaining apparatus 2110, the hierarchical image obtaining apparatus 2120, and the video image display apparatus 2150 are similar to those described Embodiment 9 above.

The video image rectifying apparatus 2130 is configured to rectify color of the video streams obtained by the depth information obtaining apparatus 2110. In this embodiment, the video image rectifying apparatus 2130 is connected to the hierarchical image obtaining apparatus 2120, and performs color rectification after the image data in a depth position of the video stream is obtained. Nevertheless, it is also practicable to obtain the image data in a depth position of the video stream after the color of the video stream is rectified.

In this embodiment, the video image rectifying apparatus 2130 includes an obtaining unit 2131, a selecting unit 2132, a generating unit 2133, and a rectifying unit 2134, which are connected in tandem.

The obtaining unit 2131 is configured to obtain at least two video images to be rectified, where an overlap region exists between every two adjacent video images among the at least two rectified video images.

The selecting unit 2132 is configured to select matched feature points of every two adjacent video images to be rectified from the overlap region.

The generating unit 2133 is configured to generate a color rectification matrix of every two adjacent video images to be rectified according to the matched feature points.

The rectifying unit 2134 is configured to use the color rectification matrix to rectify the video stream.

It should be noted that the color rectification for the video stream in this embodiment depends on the color rectification matrix generated by the generating unit 2133. In this embodiment, the color rectification matrix may be generated after the hierarchical image obtaining apparatus 2120 obtains the image data in the depth position of the video stream, or generated before the video stream is obtained. In this embodiment, video streams can be rectified only by using the color rectification matrix generated beforehand.

In this embodiment, the 3D panoramic video stream generating apparatus 2140 is configured to stitch the rectified video streams obtained from different viewpoints based on the depth information, and generate 3D panoramic video streams.

This embodiment not only brings benefits of Embodiment 9, but also performs color rectification for the video images so that the users can have a panoramic videoconference of good luminance and hue. In this embodiment of the present invention, an overlap region between two adjacent images is required only at the time of calculating the color rectification matrix. In the rectification process, color rectification can be performed through the color rectification matrix no matter whether any overlap region exists between the video images.

Moreover, the color rectification matrix needs to be generated only once, which saves time of rectifying color of video images.

Those skilled in the art are clearly aware that the present invention may be implemented through software in addition to a necessary universal hardware platform. Therefore, the essence or novelty of the technical solution of the present invention may be embodied in a software product. The software product may be stored in storage media such as ROM/RAM, magnetic disk, or CD-ROM, and incorporates several instructions that make a computer device (for example, a personal computer, a server, or a network device) execute the methods specified in any embodiment of the present invention or part of the embodiment.

Although the invention has been described through several preferred embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the appended claims or their equivalents.

What is claimed is:

1. In a 3-dimensional depth mapping device, a method for generating overall image data of objects at multiple depths, the method comprising:
   obtaining first depth information relative to at least two different focal points of an overall image, which results in at least two different image data views, at a first depth position, to be stitched;
   creating first stitched image data by stitching the at least two different image data views at the first depth position, which corresponds to one or more objects within an overall image at the first depth;
   obtaining second depth information relative to the at least two different focal points of the overall image, which results in at least two different image data views, at a second depth position, to be stitched;
   creating second stitched image data by stitching the at least two different image data views at the second depth position, which corresponds to one or more objects within an overall image at the second depth; and
   generating synthesized image data of the one or more objects at multiple depths by combining the first stitched image data with the second stitched image data.

2. The method according to claim 1, wherein the first depth information and the second depth information are obtained simultaneously by at least two depth cameras, which are used to obtain the at least two different image data views at the first death position and the at least two different image data views at the second death position.

3. The method according to claim 1, wherein: the at least two different image data views at the first and second depth positions are frames of at least two different video streams taken at a same instance in time, the method further comprises:
   detecting an image change region of image data in each depth position in a current frame compared with image data in a corresponding depth position in a previous frame of each video stream;
   determining that the change region is greater than a set threshold; and
   based on the determination, stitching only the image data in the change region.

4. The method according to claim 1, wherein the at least two different image data views at the first and second depth positions are at least two images to be stitched taken at a same instance in time;
   before creating the first stitched image data and creating the second stitched image data, the method further comprises: rectifying the images; and
   the rectifying of the images comprises:
   obtaining at least two images to be rectified, wherein an overlap region exists between every two adjacent images among the at least two video images to be rectified;
   selecting matched feature points of every two adjacent images to be rectified from the overlap region;
   generating a color rectification matrix of every two adjacent images to be rectified according to the matched feature points; and
   using the color rectification matrix to rectify the images to be stitched.

5. The method according to claim 4, wherein after obtaining the at least two images to be rectified, the method further comprises:
   preprocessing the at least two images to be rectified by smooth denoising, and/or distortion rectification.

6. The method according to claim 4, wherein after obtaining the at least two images to be rectified, the method further comprises:
   performing color space transformation for the at least two images to be rectified; and
   formats of the images before and after the color space transformation comprise: RGB, HSV, YUV, HSL, CIE-Lab, CIE-Luv, CMY, CMYK, and XYZ.

7. The method according to claim 4, wherein the selecting of the matched feature points of every two adjacent images to be rectified from the overlap region comprises:
   detecting Scale-Invariant Feature Transformation (SIFT) feature points in the overlap region, and matching the detected feature points to obtain multiple pairs of matched feature points of two adjacent images to be rectified; or
   detecting the SIFT feature points in the overlap region, matching the detected feature points to obtain multiple pairs of matched feature points of two adjacent images to be rectified, finding regions of the same area by pivoting on the matched feature points, and assigning a mean value of color features of the found regions to the matched feature points; or
   splitting the overlap region, using corresponding regions in the split overlap region of the two images to be rectified as matched feature points, and assigning the mean value of color features of the corresponding regions to the matched feature points; or
   receiving region blocks which are manually selected from the overlap region, using the corresponding selected region blocks of the two video images to be rectified as matched feature points, and assigning a mean value of color features of the corresponding region blocks to the matched feature points.

8. The method according to claim 4, wherein in every two adjacent images to be rectified, one is a source video image, and the other is a destination image;
   the generating of the color rectification matrix of every two adjacent images to be rectified according to the matched feature points comprises:
   establishing a color space matrix of the source image and a color space matrix of the destination image, wherein each row of the color space matrix represents color space attributes of one of the matched feature points;

establishing a matrix transformation relation between the color space matrix of the source image and the color space matrix of the destination image, wherein the transformation relation is: the color space matrix of the source image is multiplied by the color rectification matrix, and a multiplication result plus an error amount is the color space matrix of the destination image; and calculating the color rectification matrix when the error amount is the smallest according to the transformation relation.

9. The method according to claim 4, wherein: when obtaining two images to be rectified, the using of the color rectification matrix to rectify the images to be stitched comprises:

receiving the images to be stitched from an inputting apparatus which inputs the source image;

generating a color space matrix of the images to be stitched;

multiplying the color rectification matrix by the color space matrix of the images to be stitched, and using a multiplication result as the color space matrix of rectified images to be stitched; and generating the rectified images to be stitched according to the color space matrix of the rectified images to be stitched.

10. The method according to claim 4, wherein:

at time of obtaining N images to be rectified that are adjacent in tandem, wherein N is a natural number greater than 2, the N images to be rectified comprise N−1 pairs of adjacent images to be rectified, and each pair of images to be rectified corresponds to a color rectification matrix;

the using of the color rectification matrix to rectify the images to be stitched comprises:

receiving a image to be stitched from an inputting apparatus, wherein the image to be stitched is a image K among the N images;

generating a color space matrix of the image to be stitched;

multiplying a color rectification matrix 1 to a color rectification matrix K−1 in tandem to generate a color rectification matrix of the image to be stitched;

multiplying the color rectification matrix by the color space matrix of the image to be stitched, and using the multiplication result as the color space matrix of rectified image to be stitched; and generating the rectified image to be stitched according to the color space matrix of the rectified image to be stitched.

11. A 3-dimensional (3D) panoramic videoconference method, comprising:

obtaining first depth information relative to at least two different focal points of an overall image, which results in at least two different image data views, at a first depth position, to be stitched;

creating first stitched image data by stitching the at least two different image data views at the first depth position, which corresponds to one or more objects within an overall image at the first depth;

obtaining second depth information relative to the at least two different focal points of the overall image, which results in at least two different image data views, at a second depth position, to be stitched;

creating second stitched image data by stitching the at least two different image data views at the second depth position, which corresponds to one or more objects within an overall image at the second depth;

wherein: the at least two different image data views at the first and second depth positions are frames of at least two different video streams of the same site taken at a same instance in time from at least two viewpoints;

generating a synthesized frame comprising the one or more objects at multiple depths by combining the first stitched image data with the second stitched image data;

displaying the synthesized frame on a terminal display according to a type of the terminal display.

12. The method according to claim 11, wherein:

before creating the first stitched image data and creating the second stitched image data, the method further comprises:

obtaining at least two images to be rectified, wherein an overlap region exists between every two adjacent images among the at least two images to be rectified;

selecting matched feature points of every two adjacent images to be rectified from the overlap region;

generating a color rectification matrix of every two adjacent images to be rectified according to the matched feature points; and using the color rectification matrix to rectify the frames.

13. The method according to claim 11, wherein the displaying of the synthesized frame on the terminal display according to the type of the terminal display comprises:

displaying 2-dimensional (2D) image information of the synthesized frame if it is determined that the terminal display is a 2D display;

displaying 3D image information of the synthesized frame if it is determined that the terminal display is a 3D display; or displaying image information in multiple depth positions of the synthesized frame if it is determined that the terminal display is a multi-layer display.

14. The method according to claim 11, further comprising:

establishing a mapping relation between gesture information and display control instructions;

obtaining video images of gestures made by persons on the site, and obtaining the gesture information;

obtaining a display control instruction corresponding to the obtained gesture information according to the mapping relation; and controlling display activities of the terminal display according to the obtained display control instruction.

15. A device for generating overall image data of objects at multiple depths, comprising:

a depth information obtaining apparatus, configured to obtain first depth information relative to at least two different focal points of an overall image, which results in at least two different image data views, at a first depth position, to be stitched, and configured to obtain second depth information relative to the at least two different focal points of the overall image, which results in at least two different image data views, at a second depth position, to be stitched;

a 3D panoramic video stream generating apparatus, configured to create first stitched image data by stitching the at least two different image data views at the first depth position, which corresponds to one or more objects within an overall image at the first depth, create second stitched image data by stitching the at least two different image data views at the second depth position, which corresponds to one or more objects within an overall image at the second depth, and generate synthesized image data of the one or more objects at multiple depths by combining the first stitched image data with the second stitched image data.

16. The device according to claim 15, wherein:
the depth information obtaining apparatus comprises at least two depth cameras; and
the depth cameras are configured to obtain the first depth information and the second depth information simultaneously, and configured to obtain the at least two different image data views at the first depth position and the at least two different image data views at the second depth position.

17. The device according to claim 15, wherein, the at least two different image data views at the first and second depth positions are frames of at least two different video streams taken at a same instance in time, the 3D panoramic video stream generating apparatus comprises an image detecting unit and an image stitching unit:
the image detecting unit, is configured to: detect an image change region of image data in each depth position in a current frame compared with image data in a corresponding depth position in a previous frame of each video stream; and output an image stitch instruction after determining that the change region is greater than a set threshold;
the image stitching unit, is configured to: stitch the image data in the change region according to the image stitch instruction.

18. The device according to claim 15, wherein the at least two different image data views at the first and second depth positions are at least two images to be stitched taken at a same instance in time, and wherein the device further comprises a video image rectifying apparatus which comprises:
an obtaining unit, configured to obtain at least two images to be rectified, wherein an overlap region exists between every two adjacent images among the at least two images to be rectified;
a selecting unit, configured to select matched feature points of every two adjacent images to be rectified from the overlap region;
a generating unit, configured to generate a color rectification matrix of every two adjacent images to be rectified according to the matched feature points; and
a rectifying unit, configured to use the color rectification matrix to rectify the images to be stitched.

19. The device according to claim 18, wherein the video image rectifying apparatus further comprises:
a preprocessing unit, configured to preprocess the at least two images to be rectified, after the obtaining unit obtains the at least two images to be rectified, smooth denoising and/or distortion rectification.

20. The device according to claim 18, wherein the video image rectifying apparatus further comprises:
a transforming unit, configured to perform color space transformation for the at least two images to be rectified, wherein formats of the images before and after the transformation comprise RGB, HSV, YUV, HSL, CIE-Lab, CIE-Luv, CMY, CMYK, and XYZ.

21. The device according to claim 18, wherein the selecting unit comprises at least one of the following units:
a first selecting unit, configured to detect Scale-Invariant Feature Transformation (SIFT) feature points in the overlap region, and match the detected feature points to obtain multiple pairs of matched feature points of two adjacent images to be rectified;
a second selecting unit, configured to: detect SIFT feature points in the overlap region, match the detected feature points to obtain multiple pairs of matched feature points of two adjacent images to be rectified, find regions of the same area by pivoting on the matched feature points, and assign a mean value of color features of the found regions to the matched feature points;
a third selecting unit, configured to: split the overlap region, use corresponding regions in the split overlap region of the two images to be rectified as matched feature points, and assign the mean value of color features of the corresponding regions to the matched feature points; and
a fourth selecting unit, configured to receive region blocks which are manually selected from the overlap region, use the corresponding selected region blocks of the two images to be rectified as matched feature points, and assign the mean value of color features of the corresponding region blocks to the matched feature points.

22. The device according to claim 18, wherein:
in every two adjacent images to be rectified, one is a source image, and the other is a destination image;
the generating unit comprises:
a color matrix creating unit, configured to create a color space matrix of the source image and a color space matrix of the destination image, wherein each row of the color space matrix represents color space attributes of one of the matched feature points;
a transformation relation establishing unit, configured to establish a matrix transformation relation between the color space matrix of the source image and the color space matrix of the destination image, wherein transformation relation is: the color space matrix of the source image is multiplied by the color rectification matrix, and a multiplication result plus an error amount is the color space matrix of the destination image; and
a rectification matrix calculating unit, configured to calculate the color rectification matrix when the error amount is the smallest according to the transformation relation.

23. The device according to claim 18, wherein:
if the obtaining unit obtains two images to be rectified, the rectifying unit comprises:
a video image receiving unit, configured to receive a image to be stitched from an inputting apparatus which inputs the source image;
a color matrix generating unit, configured to generate a color space matrix of the image to be stitched;
a color matrix transforming unit, configured to multiply the color rectification matrix by the color space matrix of the image to be stitched, and use a multiplication result as the color space matrix of the rectified image to be stitched; and
a rectification result generating unit, configured to generate the rectified image to be stitched according to the color space matrix of the rectified image to be stitched.

24. The device according to claim 18, wherein:
if the obtaining unit obtains N images to be rectified that are adjacent in tandem, N is a natural number greater than 2, the N images comprise N−1 pairs of adjacent images to be rectified, and each pair of images to be rectified corresponds to a color rectification matrix;
the rectifying unit comprises:
a video image receiving unit, configured to receive a image to be stitched from an inputting apparatus, wherein the image to be stitched is a image K among the N images;
a first color matrix generating unit, configured to generate a color space matrix of the image to be stitched;
a rectification matrix generating unit, configured to multiply a color rectification matrix 1 to a color rectification matrix K−1 in tandem to generate a color rectification matrix of the image to be stitched;

a second color matrix generating unit, configured to multiply the color rectification matrix by the color space matrix of the image to be stitched, and use the multiplication result as the color space matrix of the rectified image to be stitched; and a rectification result generating unit, configured to generate the rectified image to be stitched according to the color space matrix of the rectified image to be stitched.

25. A 3-dimensional (3D) panoramic videoconference device, comprising:

a depth information obtaining apparatus, configured to obtain first depth information relative to at least two different focal points of an overall image, which results in at least two different image data views, at a first depth position, to be stitched, and obtain second depth information relative to the at least two different focal points of the overall image, which results in at least two different image data views, at a second depth position, to be stitched, wherein: the at least two different image data views at the first and second depth positions are frames of at least two different video streams of the same site taken at a same instance in time from at least two viewpoints;

a 3D panoramic video stream generating apparatus, configured to create first stitched image data by stitching the at least two different image data views at the first depth position which corresponds to one or more objects within an overall image at the first depth, create second stitched image data by stitching the at least two different image data views at the second death position which corresponds to one or more objects within an overall image at the second depth, and generate a synthesized frame comprising the one or more objects at multiple depths by combining the first stitched image data with the second stitched image data; and a video image display apparatus, configured to display the synthesized frame on a terminal display according to a type of the terminal display.

26. The device according to claim 25, wherein the device further comprises a video image rectifying apparatus which comprises:

an obtaining unit, configured to obtain at least two images to be rectified, wherein an overlap region exists between every two adjacent images among the at least two images to be rectified;

a selecting unit, configured to select matched feature points of every two adjacent images to be rectified from the overlap region;

a generating unit, configured to generate a color rectification matrix of every two adjacent images to be rectified according to the matched feature points; and a rectifying unit, configured to use the color rectification matrix to rectify the frames.

27. The device according to claim 25, further comprising:

a display type determining unit, configured to determines a type of a display, and output a display instruction according to a determination result; and the display, configured to display the synthesized frame according to the display instruction.

28. The device according to claim 25, further comprising:

a gesture instruction storing apparatus, configured to store a mapping relation between gesture information and display control instructions;

a gesture information obtaining apparatus, configured to obtain video images of gestures made by persons on the site, and obtain the gesture information;

a display instruction obtaining apparatus, configured to obtain a display control instruction corresponding to the obtained gesture information according to the mapping relation; and a display control apparatus, configured to control display activities of the terminal display according to the obtained display control instruction.

29. A computer program product comprising computer executable instructions, which are stored on a non-transitory computer readable medium such that when executed by a computer program processor cause a 3-dimensional (3-D) depth mapping device to perform the following:

obtain first depth information relative to at least two different focal points of an overall image, which results in at least two different image data views, at a first depth position, to be stitched;

create first stitched image data by stitching the at least two different image data views at the first depth position, which corresponds to one or more objects within an overall image at the first depth;

obtain second depth information relative to the at least two different focal points of the overall image, which results in at least two different image data views, at a second depth position, to be stitched;

create second stitched image data by stitching the at least two different image data views at the second depth position, which corresponds to one or more objects within an overall image at the second depth; and generate synthesized image data of the one or more objects at multiple depths by combining the first stitched image data with the second stitched image data.

30. The computer program product according to claim 29, wherein the first depth information and the second depth information are obtained simultaneously by at least two depth cameras, which are used to obtain the at least two different image data views at the first depth position and the at least two different image data views at the second depth position.

31. The computer program product according to claim 29, wherein the at least two different image data views at the first and second depth positions, which are to be stitched, are frames of at least two different video streams taken at a same instance in time, and wherein the computer executable instructions further cause the 3-D depth mapping device to perform the following:

detect an image change region of image data in each depth position in a current frame compared with image data in a corresponding depth position in a previous frame of each video stream;

determine that the change region is greater than a set threshold; and based on the determination, stitch only the image data in the change region.

32. The computer program product according to claim 29, wherein the at least two different image data views at the first and second depth positions are at least two images to be stitched taken at a same instance in time, and wherein before create the first stitched image data and create the second stitched image data, the computer executable instructions further cause the 3-D depth mapping device to perform the following:

obtain at least two images to be rectified, wherein an overlap region exists between every two adjacent images among the at least two video images to be rectified;

select matched feature points of every two adjacent images to be rectified from the overlap region;

generate a color rectification matrix of every two adjacent images to be rectified according to the matched feature points; and
use the color rectification matrix to rectify the images to be stitched.

33. The computer program product according to claim 32, wherein after obtaining the at least two images to be rectified, the computer executable instructions further cause the 3-D depth mapping device to perform the following:
preprocess the at least two images to be rectified by smooth denoise, and/or rectify distortion.

34. The computer program product according to claim 32, wherein after obtaining the at least two images to be rectified, the computer executable instructions further cause the 3-D depth mapping device to perform the following:
perform color space transformation for the at least two images to be rectified; and
format of the images before and after the color space transformation comprise: RGB, HSV, YUV, HSL, CIE-Lab, CIE-Luv, CMY, CMYK, and XYZ.

35. The computer program product according to claim 32, wherein the computer executable instructions that cause the selecting of the matched feature points of every two adjacent images to be rectified from the overlap region further cause the 3-D imaging device to perform one or more of the following:
detect Scale-Invariant Feature Transformation (SIFT) feature points in the overlap region, and matching the detected feature points to obtain multiple pairs of matched feature points of two adjacent images to be rectified; or
detect the SIFT feature points in the overlap region, matching the detected feature points to obtain multiple pairs of matched feature points of two adjacent images to be rectified, finding regions of the same area by pivoting on the matched feature points, and assigning a mean value of color features of the found regions to the matched feature points; or
split the overlap region, using corresponding regions in the split overlap region of the two images to be rectified as matched feature points, and assigning the mean value of color features of the corresponding regions to the matched feature points; or
receive region blocks which are manually selected from the overlap region, using the corresponding selected region blocks of the two video images to be rectified as matched feature points, and assigning a mean value of color features of the corresponding region blocks to the matched feature points.

36. The computer program product according to claim 32, wherein in every two adjacent images to be rectified, one is a source image, and the other is a destination image, and wherein the computer executable instructions that cause the generating of the color rectification matrix of every two adjacent images to be rectified according to the matched feature points further cause the 3-D imaging device to perform the following:
establish a color space matrix of the source image and a color space matrix of the destination image, wherein each row of the color space matrix represents color space attributes of one of the matched feature points;
establish a matrix transformation relation between the color space matrix of the source image and the color space matrix of the destination image, wherein the transformation relation is: the color space matrix of the source image is multiplied by the color rectification matrix, and a multiplication result plus an error amount is the color space matrix of the destination image; and
calculate the color rectification matrix when the error amount is the smallest according to the transformation relation.

37. The computer program product according to claim 32, wherein when obtaining two images to be rectified, the computer program instructions that cause the use of the color rectification matrix to rectify the images to be stitched further cause the 3-D imaging device to perform the following:
receive the images to be stitched from an inputting apparatus which inputs the source image;
generate a color space matrix of the images to be stitched;
multiply the color rectification matrix by the color space matrix of the images to be stitched, and using a multiplication result as the color space matrix of the rectified images to be stitched; and
generate the rectified images to be stitched according to the color space matrix of the rectified images to be stitched.

38. The computer program product according to claim 32, wherein at time of obtain N images to be rectified that are adjacent in tandem, wherein N is a natural number greater than 2, the N images to be rectified comprise N−1 pairs of adjacent images to be rectified, and each pair of images to be rectified corresponds to a color rectification matrix, and wherein the computer program instruction that cause the use of the color rectification matrix to rectify the images to be stitched further cause the 3-D imaging device to perform the following:
receive a image to be stitched from an inputting apparatus, wherein the image to be stitched is a image K among the N images;
generate a color space matrix of the image to be stitched;
multiply a color rectification matrix 1 to a color rectification matrix K−1 in tandem to generate a color rectification matrix of the image to be stitched;
multiply the color rectification matrix by the color space matrix of the image to be stitched, and using the multiplication result as the color space matrix of rectified image to be stitched; and
generate the rectified image to be stitched according to the color space matrix of the rectified image to be stitched.

39. A computer program product comprising computer executable instructions, which are stored on a non-transitory computer readable medium such that when executed by a computer program processor cause a 3-dimensional (3D) panoramic videoconference device to perform the following:
obtain first depth information relative to at least two different focal points of an overall image, which results in at least two different image data views, at a first depth position, to be stitched;
create first stitched image data by stitching the at least two different image data views at the first depth position, which corresponds to one or more objects within an overall image at the first depth;
obtain second depth information relative to the at least two different focal points of the overall image, which results in at least two different image data views, at a second depth position, to be stitched;
create second stitched image data by stitching the at least two different image data views at the second depth position, which corresponds to one or more objects within an overall image at the second depth;
wherein: the at least two different image data views at the first and second depth positions are frames of at least two different video streams of the same site taken at a same instance in time from at least two viewpoints;

generate a synthesized frame comprising the one or more objects at multiple depths by combining the first stitched image data with the second stitched image data;

display the synthesized frame on a terminal display according to a type of the terminal display.

40. The computer program product according to claim 39, wherein:

before create the first stitched image data and create the second stitched image data, the computer executable instructions further cause the 3D panoramic videoconference device to perform the following:

obtain at least two images to be rectified, wherein an overlap region exists between every two adjacent images among the at least two images to be rectified;

select matched feature points of every two adjacent images to be rectified from the overlap region;

generate a color rectification matrix of every two adjacent images to be rectified according to the matched feature points; and use the color rectification matrix to rectify the frames.

41. The computer program product according to claim 39, wherein the computer executable instructions that cause the displaying of the synthesized frame on the terminal display according to the type of the terminal display further cause the 3-D mapping device to perform the following:

display 2-dimensional (2D) image information of the synthesized frame if it is determined that the terminal display is a 2D display;

display 3D image information of the synthesized frame if it is determined that the terminal display is a 3D display; or display image information in multiple depth positions of the synthesized frame if it is determined that the terminal display is a multi-layer display.

42. The computer program product according to claim 39, wherein the computer executable instructions further cause the 3-D depth mapping device to perform the following:

establish a mapping relation between gesture information and display control instructions;

obtain video images of gestures made by persons on the site, and obtaining the gesture information;

obtain a display control instruction corresponding to the obtained gesture information according to the mapping relation; and control display activities of the terminal display according to the obtained display control instruction.

\* \* \* \* \*

UNITED STATES PATENT AND TRADEMARK OFFICE
CERTIFICATE OF CORRECTION

| | | |
|---|---|---|
| PATENT NO. | : 8,717,405 B2 | Page 1 of 1 |
| APPLICATION NO. | : 13/172193 | |
| DATED | : May 6, 2014 | |
| INVENTOR(S) | : Kai Li et al. | |

It is certified that error appears in the above-identified patent and that said Letters Patent is hereby corrected as shown below:

In the Claims

Claim 2, Column 21, Line 53:

Delete "death" and insert --depth--, therefor

Claim 2, Column 21, Line 54:

Delete "death" and insert --depth--, therefor

Signed and Sealed this
Second Day of June, 2015

Michelle K. Lee
*Director of the United States Patent and Trademark Office*